US012794920B2

(12) United States Patent
Vittal et al.

(10) Patent No.: US 12,794,920 B2
(45) Date of Patent: Nov. 10, 2026

(54) SECURITY THREAT DETECTION IN OPERATIONAL TECHNOLOGY ENVIRONMENT

(71) Applicant: Honeywell International Inc., Charlotte, NC (US)

(72) Inventors: Chandrakanth Vittal, Bangalore (IN); Atul Bassi, Bangalore (IN); Minal Dani, Bangalore (IN); Anubhav Misra, Bangalore (IN); Tarun Gupta, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 108 days.

(21) Appl. No.: 18/829,302

(22) Filed: Sep. 10, 2024

(65) Prior Publication Data

US 2026/0075071 A1 Mar. 12, 2026

(51) Int. Cl.
*H04L 9/40* (2022.01)

(52) U.S. Cl.
CPC ................................ *H04L 63/1425* (2013.01)

(58) Field of Classification Search
CPC .................................................. H04L 63/1425
USPC ........................................................... 726/23
See application file for complete search history.

(56) References Cited

U.S. PATENT DOCUMENTS

| | | | | |
|---|---|---|---|---|
| 11,297,094 | B2 | 4/2022 | Huda | |
| 11,429,718 | B2 | 8/2022 | Kling et al. | |
| 11,927,949 | B2 | 3/2024 | Yang | |
| 12,197,578 | B1 * | 1/2025 | Brandwine | G06F 21/554 |
| 12,487,875 | B1 * | 12/2025 | Côrte-Real | G06F 11/0769 |
| 2016/0065603 | A1 * | 3/2016 | Dekel | H04L 63/1425 726/23 |
| 2017/0237752 | A1 | 8/2017 | Ganguly et al. | |
| 2022/0342988 | A1 | 10/2022 | Brunza et al. | |
| 2024/0333739 | A1 * | 10/2024 | Agrawal | H04L 63/1425 |
| 2025/0030725 | A1 * | 1/2025 | Fellows | H04L 63/1433 |
| 2025/0245212 | A1 * | 7/2025 | Li | H04L 41/145 |

OTHER PUBLICATIONS

Cheung et al., Modeling Multistep Cyber Attacks for Scenario Recognition, 2003, IEEE, Proceedings of the DARPA Survivability Conference and Exposition, All pages (Year: 2003).*

* cited by examiner

*Primary Examiner* — Michael S McNally
(74) *Attorney, Agent, or Firm* — Alston & Bird LLP

(57) ABSTRACT

Approaches for automated and efficient detection of cybersecurity threats in operational technology (OT) environments are described. According to one example, operation data corresponding to an asset operating within an OT environment of an organization is obtained. The operation data is indicative of operating parameter values associated with the asset and a particular time at which the operating parameter values are obtained. Upon detecting an anomaly in at least one of the operating parameter values, information technology (IT) data corresponding to the organization is obtained for a pre-defined time window around the particular time. The IT data may include network access and activity logs associated with a communication network of the organization. Upon ascertaining a possibility of a cyberthreat event based on processing of the operation data and the IT data, an alert, including recommendation for preventing a cyberattack on the communication network, may be generated.

20 Claims, 10 Drawing Sheets

SECURITY THREAT DETECTION IN OPERATIONAL TECHNOLOGY ENVIRONMENT

BACKGROUND

Generally, across all industries, numerous operations are performed on a daily basis through devices connected to each other over a communication network. For example, assets or operating devices, such as sensors, switches, controllers, processing equipment, field devices, and other electronic devices may be connected to each other or other network devices, such as servers, databases, firewalls, for monitoring, controlling, and performing physical industrial processes. From among these numerous interconnected devices, some assets may operate within an operational technology (OT) environment of the organization, while some assets and network devices may be a part of an information technology (IT) network of the organization.

With large scale digitalization, most of the industrial processes are also being automated to enhance operational efficiency and enable data-driven decision-making and remote management. For such automation, the OT environment has become increasingly interconnected with wired and wireless networks, including the Internet, to collect, analyze, and leverage data on industry's premises and in the cloud. Thus, the OT environments have become increasingly exposed to cyber threats that may compromise the safety and reliability of the industrial operations.

BRIEF DESCRIPTION OF FIGURES

Systems and/or methods are now described, in accordance with examples of the present subject matter and with reference to the accompanying figures, in which.

DETAILED DESCRIPTION

Figure 1:
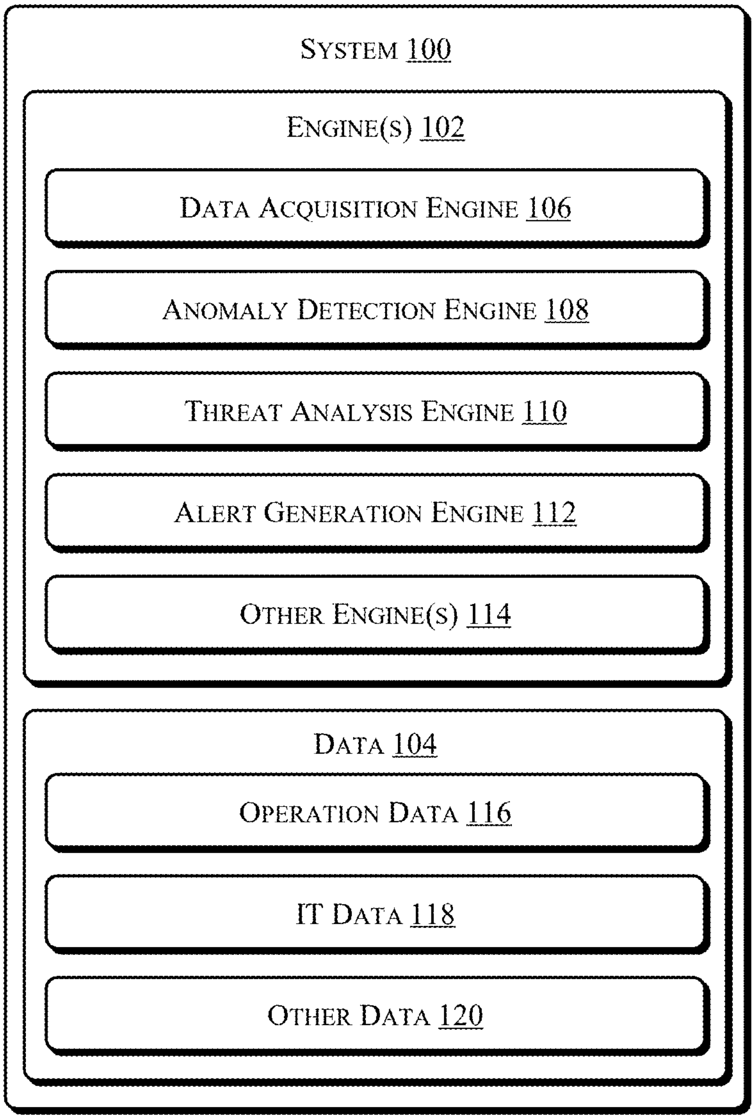
FIG. 1 illustrates a system for detecting a security threat in an operational technology (OT) environment, according to an example.

Operational technology (OT) environments are vital for effective operation of industrial processes. Connectivity of the OT environments to wired or wireless networks exposes the OT environments to cyber threats that may compromise the safety and reliability of industrial operations. Cyber-attacks directed at systems or devices within an OT environment of an organization may result in an unauthorized access of critical industrial data, interruption of crucial processes, complete manufacturing blockage leading to huge monetary losses for the organization. Inefficient cyber-security for the OT environment of the organization may thus result in undesired operational disruptions, system failures, and downtime, thereby leading to severe consequences, including production delays, decreased efficiency of the OT environment, reputational damage for the organization, and financial losses for the organization.

Inadequate OT cybersecurity may further cause safety risks to employees of the organization, the public, and the environment. For example, cyber-attacks targeting the OT environments in industries, such as manufacturing, energy, transportation, etc., may potentially lead to dangerous accidents, equipment malfunctions, or environmental disasters, jeopardizing human lives and causing significant damage to the environment and the organization's infrastructure. Such accidents or disasters may even lead to non-compliance of standard regulations due to which the organization may suffer regulatory penalties, legal repercussions, and reputational harm. Inefficient cybersecurity for the OT environments may put the organization at a competitive disadvantage due to lack of trust in customers, partners, and other stakeholders.

Once the security of the OT environment is breached, addressing vulnerabilities in the OT cybersecurity may be expensive. For example, the organization may need to cover expenses for the loss in productivity due to the downtime, legal and technical costs, fines, customer compensation, and damage control costs. The organization, additionally, may also be required to pay ransom in case of a ransomware attack. Thus, organizations implement security measures for prevention of cyber-attacks on the OT environments.

Traditional security measures typically have a deterministic approach relying on pre-defined rules for detection of cyberthreats in OT environments. Such pre-defined rules are typically created once and are then used for a long time. For instance, for an industrial plant, a rule may be pre-defined according to which a security alert may be issued to a plant operator whenever a pre-defined condition is met. The pre-defined condition may be, for example, crossing of a total load, across all controllers operating in the industrial plant, over a threshold load limit. Thus, whenever, the total load crossed over the threshold load limit, the plant operator may receive the security alert and may initiate investigation to look into reasons of such increase in the load. Similarly, threshold limits may be assigned to different operating parameters associated with assets operating with the industrial plant for detection of the cyberthreats in the OT environments.

However, such traditional security measures prove to be insufficient for detection and prevention of any cyberthreat in the OT environment as the threshold limits are typically kept higher than designated operating ranges to avoid frequent alerts. Therefore, by the time the threshold limit is crossed, and an alert is issued to the plant operator, a malicious user may have already gained unauthorized access to control the assets within the industrial plant and the malicious user may have already started harmful activities. Further, for investigating and finding the reasons that caused such increase in the load, the plant operator consumes a lot of time due to the complexity and the volume of the data that is related to the affected operation in the industrial plant. Thus, by the time the plant operator completes the investigation manually, the malicious user may have already performed the desired unauthorized actions. For example, by the time the plant operator decides to take any action regarding the load of the controllers subsequent to the alert, the controllers may have already transitioned into a failed state. Thus, due to delay in detection of the cyberthreat and due to the manual efforts required by the plant operator, such traditional security measures fail to prevent organizations from cyberattacks. Once a cyberattack is successful, transitioning the OT environment to a normal operating state may require a lot of time and resources.

The challenge of detecting and preventing the cyberattacks in the OT environment is amplified by the abundance of hardware devices, controllers, network access logs, and alerts in OT cybersecurity. The challenge of detecting and preventing the cyberattacks in the OT environment is further amplified in a heterogenous OT environment having devices or systems from different and multiple vendors. If the OT environment includes devices or systems from different and multiple vendors, different rules and conditions for threat detection may be required to be put in place and analysed, leading to further delay in the detection of the cyberthreats. The traditional security measures lack capabilities to predict potential threats before such threats impact critical industrial processes.

Some traditional security measures involve quarantining or deletion of files or data related to the assets attacked by the malicious user. However, quarantining or deleting the files or the data may affect key processes within the OT environment. Therefore, there is a need for security measures which can efficiently prevent cyber-attacks on the OT environments.

The present subject matter describes approaches for automated and efficient detection of cybersecurity threats in operational technology (OT) environments. In an example implementation of the present subject matter, initially, operation data corresponding to an asset operating within an OT environment of an organization is obtained and analyzed to detect any possible anomaly in the operation of the assets or the OT environment. When an anomaly is detected in the one or more operating parameter values, information technology (IT) data corresponding to the organization may be analyzed in correlation with the operation data to ascertain possibility of a cyberthreat event. In an example, the IT data for a pre-defined time window around a particular time, at which the anomaly has been detected, may be checked to ascertain a possibility of a cyberthreat event. Upon ascertaining a possibility of a cyberthreat event, an alert may be generated indicating a possible cyberattack. The alert may include recommendations for preventing the cyberattack on the OT environment. Thus, the described approaches not only efficiently and quickly detect a cyberthreat, but also provide recommendations for preventing the cyberattack by automatically identifying a root cause of the anomaly. The described approaches provide a simple and robust analytical methodology for early, quick, efficient, and automated detection of cyberthreat events in the OT environment. By checking the IT data in correlation with the operation data, the described approaches enable identification of a root cause of the anomaly and a perturbation pattern of network devices associated with the organization.

In an example implementation of the present subject matter, the operation data corresponding to the assets operating within the OT environment is continuously monitoring. In an example, the asset may be a device, a system, or a machine associated with the organization. The operation data may be indicative of one or more operating parameter values associated with the asset and a timing information indicating a particular time at which the one or more operating parameter values are obtained. In an example, if the asset is a controller, the one or more operating parameter values may include values of parameters, such as an average free time of the controller, an average uptime of the controller, a minimum free time of the controller, and an average operating cycle of the controller. The operation data may subsequently be processed, utilizing an anomaly detection model, to detect any anomaly in the one or more operating parameter values. In an example, for training the anomaly detection model, ideal operation data corresponding to the asset may be obtained. The ideal operation data may be indicative of different ideal operating parameter values associated with the asset and corresponding time at which the different ideal operating parameter values are obtained. The ideal operation data may be analyzed to identify an ideal operating pattern of the asset. The ideal operating pattern may indicate how the asset operates at different times. The anomaly detection model may be obtained based on training on the ideal operating pattern of the asset.

In an example, the IT data may include network access and activity logs associated with a communication network of the organization. Upon detecting the anomaly, the possibility of the cyberthreat event may be ascertained based on a correlation between the anomaly and an unusual activity detected in the network access and activity logs. In another example, the operation data, the IT data, and historical cyberattack data may be processed to ascertain possibility of a cyberthreat event. The historical cyberattack data may include pattern and analysis data related to each of one or more historic cyberattacks. The historical cyberattack data may be obtained from global databases that may include data related to various cyberattacks that have occurred in past. In an example, a threat analysis model may be utilized for ascertaining the possibility of the cyberthreat event. The threat analysis model may be obtained based on training on the historical cyberattack data of a plurality of historic cyberattacks. For ascertaining the possibility of the cyberthreat event, the operation data and the IT data may be analyzed to identify a perturbation pattern of the asset and network devices connected to the communication network. The perturbation pattern may be identified based on the correlation. Historical perturbation patterns related to the one or more historic cyberattacks may be extracted from the pattern and analysis data. The perturbation pattern may then be compared with historical perturbation patterns to ascertain the possibility of the cyberthreat event.

In an example, for generating the alert, a degree of similarity may be determined between the perturbation pattern and a historical perturbation pattern corresponding to each of the one or more historic cyberattacks. At least one historic cyberattack that is associated with the historical perturbation pattern determined to have the degree of similarity above a threshold similarity level may be identified from the one or more historic cyberattacks. Further, preventive actions having ability to prevent the at least one historic cyberattack may be obtained. The recommendation may be determined based on the preventive actions.

Since the anomaly detection model is obtained based on training on the ideal operating pattern of the asset, even if there is a small deviation from the ideal operating pattern of the asset, the described approaches may still enable easy and quick detection of anomalies within the OT environment. The described approaches accurately make a decision whether the identified perturbation pattern can be a potential cyberthreat, by correlating the detected anomaly to other unusual activities detected through the IT data. Further, the described approaches identify similar historic cyberattacks that have historical perturbation patterns similar to the identified perturbation pattern. Based on analysis of such similar historic cyberattacks, accurate recommendations can be provided to supervisors. Through the alert, the supervisor is automatically informed of the root cause of the anomaly and all the activities that happened in the communication network related to the anomaly. As a result, the supervisor can quickly take action to prevent the cyberattack on the communication network of the organization Thus, cyber-attacks on the OT environments may be prevented, before such attack impacts the organization, without a need of much manual efforts from the supervisor.

Thus, the described approaches provide a comprehensive protection against cyber-attacks and enable a robust cyber-security for the OT environment which enhances the reputation of the organization and the trust in customers, partners, and other stakeholders. Thus, the organization may be protected from safety hazards and covering expenses which would have otherwise been required to be covered in case of any undesired event. Further, the described approaches help the organizations to avoid reputational damage, regulatory penalties, legal repercussions, or jeopardizing the customer's lives.

The present subject matter is further described with reference to FIG. 1 to FIG. 10. It should be noted that the description and figures merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates a system 100 for detecting a security threat in an operational technology (OT) environment, according to an example. In one example, the system 100 may be a distributed computing system having one or more physical computing systems geographically distributed at same or different locations. In another example, one or more components of the system 100 may be hosted virtually, for example, on a cloud-based platform, while other components may be geographically distributed at same or different locations. In yet another example, the system 100 may be a stand-alone physical system geographically located at a particular location. In an example, the system 100 may be utilized by organizations that aim to secure their OT environments from cyber-attacks.

In one example, the system 100 may include engine(s) 102 and data 104. The system 100 may also include additional components, such as display, input/output interfaces, operating systems, applications, and other software or hardware components (not shown in the figures).

The engine(s) 102 may be implemented as a combination of hardware and programming, for example, programmable instructions to implement a variety of functionalities of the engine(s) 102. In examples described herein, such combinations of hardware and programming may be implemented in several different ways. For example, the programming for the engine(s) 102 may be executable instructions. Such instructions may be stored on a non-transitory machine-readable storage medium which may be coupled either directly with the system 100 or indirectly (for example, through networked means). In an example, the engine(s) 102 may include a processing resource, for example, either a single processor or a combination of multiple processors, to execute such instructions. In the present examples, the non-transitory machine-readable storage medium may store instructions that, when executed by the processing resource, implement the engine(s) 102. In other examples, the engine (s) 102 may be implemented as electronic circuitry.

In one example, the engine(s) 102 may include a data acquisition engine 106, an anomaly detection engine 108, a threat analysis engine 110, an alert generation engine 112 and other engine(s) 114. The other engine(s) 114 may further implement functionalities that supplement functions performed by the system 100 or any of the engine(s) 102.

The data 104 includes data that is either received, stored, or generated as a result of functions implemented by any of the engine(s) 102 or the system 100. It may be further noted that information stored and available in the data 104 may be utilized by the engine(s) 102 for performing various functions of the system 100. The data 104 may include operation data 116, information technology (IT) data 118, and other data 120. The operation data 116 may be indicative of one or more operating parameter values associated with assets operating within the OT environment of an organization hosting the system 100. The operation data 116 may further be indicative of timing information indicating respective time at which the one or more operating parameter values are obtained. The one or more operating parameter values may be defined as values of operating parameters related to the different assets within the OT environment. For example, if one of the assets is a controller, the one or more operating parameter values may include values of operating parameters such as an average free time of the controller, an average uptime of the controller, a minimum free time of the controller, and an average operating cycle of the controller. The IT data 118 may include network access and activity logs associated with a communication network of the organization. The network access and activity logs may be defined as access attempt details and activity details related to the assets in the OT environment and all other network devices connected to the communication network of the organization. The other data 120 may include data that is either received, stored, or generated as a result of functions implemented by any of the engine(s) 102.

In operation, the data acquisition engine 106 may obtain operation data corresponding to an asset operating within an OT environment of an organization. The operation data may be indicative of one or more operating parameter values associated with the asset. The operation data may be further indicative of a timing information indicating a particular time at which the one or more operating parameter values are obtained. In an example, the asset may be a device, a system, or a machine associated with the organization. In an example, the operation data may be obtained from the asset operating within the OT environment. In another example, the operation data may be obtained from a centralized server managing operations of the assets operating within the OT environment of the organization. In one example, the operation data may be stored as the operation data 116.

Once the operation data is obtained, the anomaly detection engine 108 may process the operation data to detect any anomaly in the one or more operating parameter values. In an example, the anomaly detection engine 108 may implement an anomaly detection model to process the operation data. The anomaly detection model may be an artificial intelligence (AI) model trained on ideal operation data of the assets to detect anomalies within the OT environment. The ideal operation data may indicate ideal operating parameter values with which the assets operate during normal operation when any adversary is not accessing a communication network of the organization. In an example, an anomaly may be detected whenever any of the one or more operating parameter values deviate from the ideal operating parameter values corresponding to the asset.

Subsequently, the threat analysis engine 110 may obtain IT data corresponding to the organization upon detecting an anomaly in at least one of the one or more operating parameter values. The IT data may include the network access and activity logs associated with the communication network of the organization. The IT data may be obtained for a pre-defined time window around the particular time. In an example, the pre-defined time window may be decided by a user as a fixed time preceding and succeeding the particular time at which the anomaly has been detected. In an example, the pre-defined time window may be initially set as a default value and may be dynamically modified later according to the situation at hand. For example, the pre-defined time window may be initially set to thirty minutes and may be changed if no logs in the IT data can be correlated to the anomaly. Thus, if the anomaly is detected at a time X, then the IT data may be fetched for thirty minutes before the time X in case of real-time threat detection. In case the threat detection is not real-time, then the IT data may be fetched for thirty minutes before and after the time X.

The threat analysis engine 110 may process the operation data and the IT data to ascertain possibility of a cyberthreat event. The possibility of a cyberthreat event may be ascertained based on a correlation between the anomaly and an unusual activity detected in the network access and activity logs. For example, the unusual activity may be a system update performed, using a dormant or an unauthorized user account, just ten minutes before the time of occurrence of the anomaly. In an example, the threat analysis engine 110 may implement a threat analysis model to obtain the IT data and process the operation data with the IT data. The threat analysis model may be a generative AI model trained on historical cyberattack data corresponding to a plurality of historic cyberattacks. The historical cyberattack data may be obtained from global databases that may include data related to various cyberattacks that have occurred in the past. The historical cyberattack data may indicate historical perturbation patterns of assets and network devices during each of the plurality of historic cyberattacks. Further, the historical cyberattack data may indicate preventive actions that have ability to prevent the historic cyberattack. In an example, a possibility of a cyberthreat event may be ascertained whenever perturbation pattern defined by the correlation between the anomaly and the unusual activity is found to be similar to any of the historical perturbation patterns.

Subsequently, the alert generation engine 112 may analyze the correlation to generate an alert upon ascertaining a possibility of a cyberthreat event. The alert may include recommendation for preventing a cyberattack on the communication network. In an example, the alert generation engine 112 may implement the threat analysis model to generate the alert. Thus, in an example, the recommendation may be provided based on the preventive actions indicated by the historical cyberattack data. The alert may enable a supervisor to proactively engage in adversary pursuit and threat hunting. Thus, the described approaches not only efficiently and quickly detect a cyberthreat, but also provide recommendations for preventing the cyberattack by automatically identifying a root cause of the anomaly based on the correlation. The described approaches provide a simple and robust analytical methodology for early, quick, efficient, and automated detection of cyberthreat events in the OT environment.

Figure 2A:
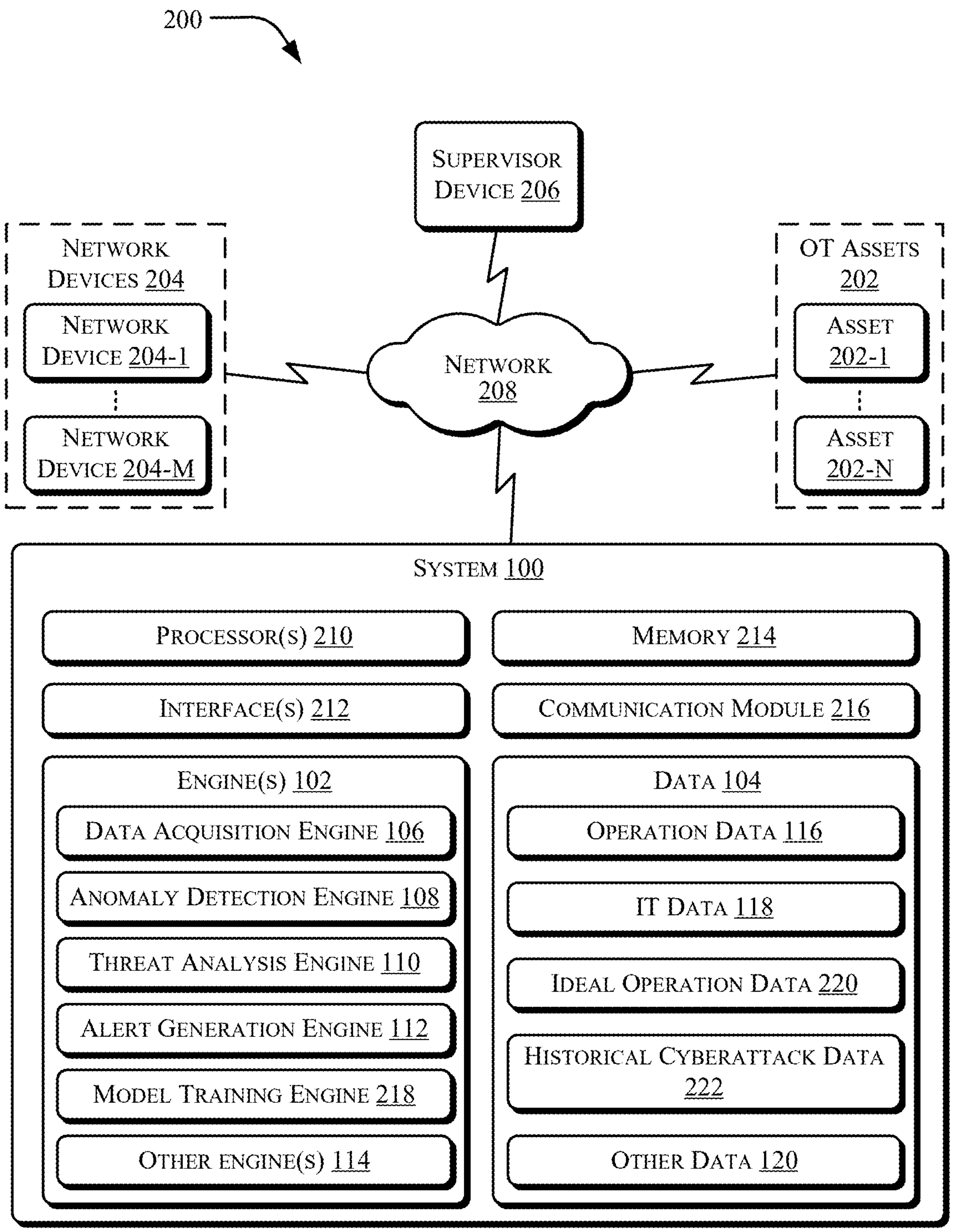
FIG. 2A and FIG. 2B illustrate a computing environment implementing the system for detecting a security threat in an OT environment, according to another example.
Figure 2B:
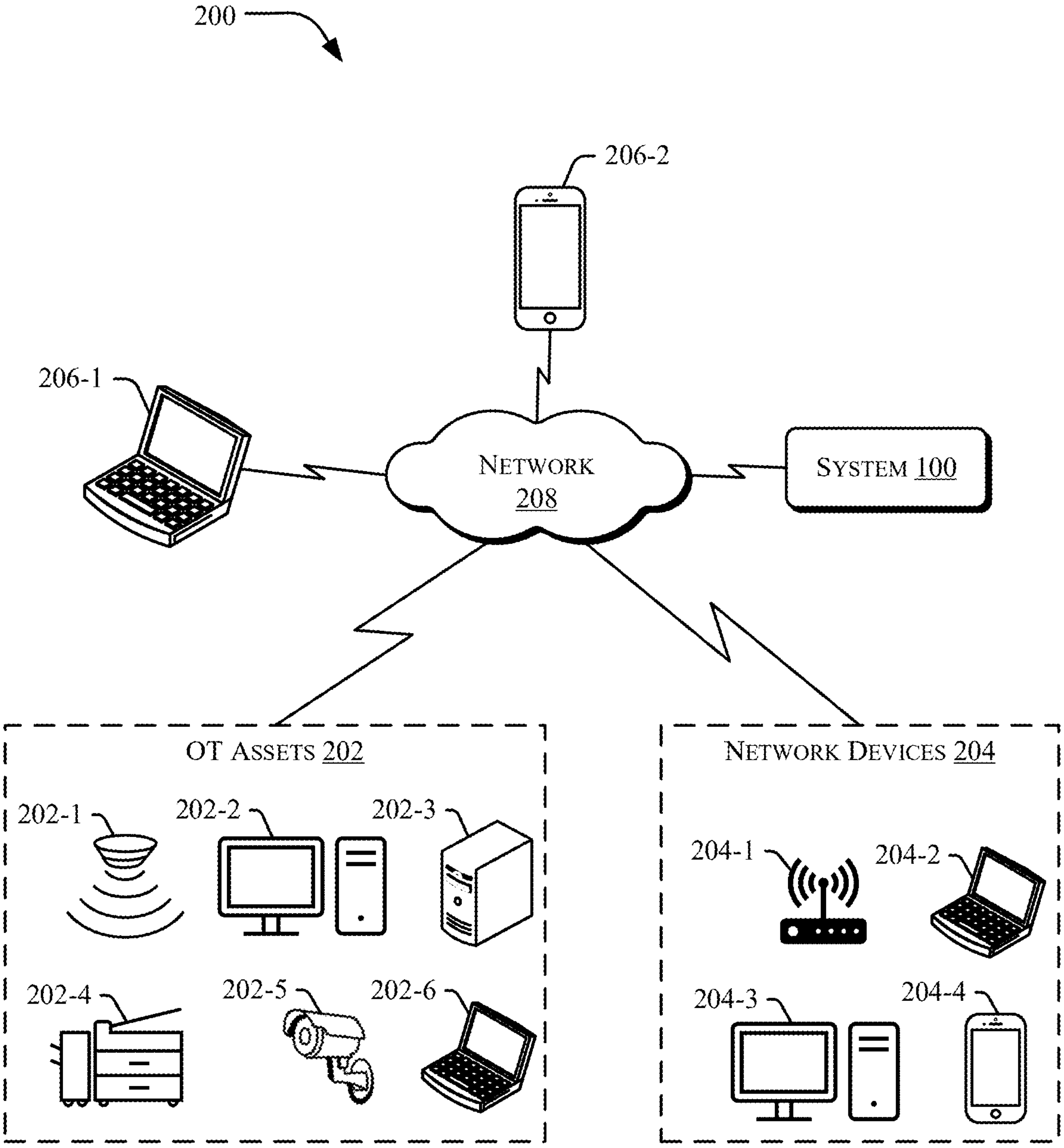

FIG. 2A and FIG. 2B illustrate a computing environment 200 implementing the system 100 for detecting a security threat in an OT environment, according to another example. In one example, the computing environment 200 may include the system 100, OT assets 202, network devices 204, and a supervisor device 206.

In an example, the OT assets 202 may be devices operating within the OT environment of a particular organization. The OT assets 202 may be assets 202-1, . . . , 202-N belonging to the organization, where N may be a natural number. The assets 202-1, . . . , 202-N may be individually referred to as asset 202 and collectively referred to as the OT assets 202. The asset 202 may be a processing equipment, a field device, an electronic device, a system, or any machine operating within the OT environment of the organization. Physical processes of the organization, production workflows of the organization, and control parameters for processing equipment or field devices operating within the OT environment may be controlled through the OT assets 202. In an example, the asset 202 may be a processing equipment or a field device, such as a sensor or an actuator, which performs physical industrial processes of the organization. In another example, the asset 202 may be a device for managing production workflows. In yet another example, the asset 202 may be an instrument for sending commands to the processing equipment or the field device. In yet another example, the asset 202 may be an industrial control system (ICS) such as a distributed control system (DCS) or a supervisory control and data acquisition (SCADA) system for supervising, monitoring, and controlling the physical processes. As exemplarily illustrated in FIG. 2B, examples of the asset 202 may include, but are not limited to, a sensor 202-1, a computer 202-2, a server 202-3, a printing machine 202-4, a camera 202-5, and a laptop 202-6, operating within the OT environment. The sensor 202-1 may be any type of sensor, such as a temperature sensor and a pressure sensor. The server 202-3 may store and manage data associated with the organization and the assets 202. Although only hardware components have been illustrated as the OT assets 202 in FIG. 2B, it should be understood that the OT assets 202 may also include software assets utilized by the organization for implementing various industrial processes. In an example, the asset 202 may operate with or without direct interaction with users associated with the organization.

The network devices 204 may be network devices 204-1, . . . , 204-M accessing a communication network of the organization, where M may be a natural number. The network devices 204-1, . . . , 204-M may be individually referred to as network device 204 and collectively referred to as the network devices 204. The network devices 204 may or may not be associated with the organization. Although the assets 202 and the network devices 204 have been illustrated separately, it should be understood that while the assets 202 are specifically associated with the OT environment of the organization, the network devices 204 may include any devices accessing the communication network including the assets 202. As exemplarily illustrated in FIG. 2B, examples of the network devices 204 may include, but are not limited to, a wireless router 204-1, a laptop 204-2, a computer 204-3, and a mobile device 204-4. In an example, the network devices 204 may be devices operating within the OT environment or an IT network of the organization. In another example, the network devices 204 may be one or more devices being used by a malicious user to access the communication network of the organization.

In an example, the supervisor device 206 may be a device over which the system 100 may provide notification to a user, such as a supervisor of an organization, about security threats detected within an OT environment of the organization. The supervisor device 206 may be accessed by the supervisor associated with the organization. In an example, the supervisor may access the supervisor device 206 to receive alerts regarding the security threats. As exemplarily illustrated in FIG. 2B, examples of the supervisor device 206 may include, but are not limited to, a laptop 206-1 and a mobile phone 206-2. Examples of the supervisor device 206 may also include, but are not limited to, a desktop, a tablet computer, a personal digital assistant (PDA) and any electronic device capable of transmitting or receiving data. Although one supervisor device 206 has been illustrated in FIG. 2A and two supervisor devices 206-1 and 206-2 have been illustrated in FIG. 2B for the sake of brevity, it should be understood to a person skilled in the art that any number of supervisor devices 206 may be connected with the system 100 to receive alerts about the security threats.

The system 100, the assets 202, the network devices 204, and the supervisor device 206 may be communicably coupled with each other over a communication network 208 and may exchange data and signals over the communication network 208. The communication network 208 may be a wireless network, a wired network, or a combination thereof. The communication network 208 may also be an individual network or a collection of many such individual networks, interconnected with each other and functioning as a single large network, e.g., the Internet or an intranet. Examples of such individual networks include local area network (LAN), wide area network (WAN), the internet, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN).

Depending on the technology, the communication network 208 may include various network entities, such as transceivers, gateways, and routers. In an example, the communication network 208 may include any communication network that uses any of the commonly used protocols, for example, Hypertext Transfer Protocol (HTTP), and Transmission Control Protocol/Internet Protocol (TCP/IP).

In one example, the system 100 may include processor(s) 210, interface(s) 212, memory 214, a communication module 216, the engine(s) 102, and the data 104. The system 100 may also include other components, such as display, input/output interfaces, operating systems, applications, and other software or hardware components (not shown in the figures).

The processor(s) 210 may be implemented as microprocessors, microcomputers, microcontrollers, digital signal processors, central processing units, state machines, logic circuitries, and/or other devices that manipulate signals based on operational instructions. The interface(s) 212 may allow the connection or coupling of the system 100 with one or more other devices, such as the OT assets 202, the network devices 204, and the supervisor device 206, through a wired (e.g., Local Area Network, i.e., LAN) connection or through a wireless connection (e.g., Bluetooth®, Wi-Fi). The interface(s) 212 may also enable intercommunication between different logical as well as hardware components of the system 100.

The memory 214 may be a computer-readable medium, examples of which include volatile memory (e.g., RAM), and/or non-volatile memory (e.g., Erasable Programmable read-only memory, i.e., EPROM, flash memory, etc.). The memory 214 may be an external memory or an internal memory, such as a flash drive, a compact disk drive, an external hard disk drive, or the like. The memory 214 may further include the data 104 and/or other data which may either be received, utilized, or generated during the operation of the system 100.

The communication module 216 may be a wireless communication module. Examples of the communication module 216 may include, but are not limited to, Global System for Mobile communication (GSM) modules, Code-division multiple access (CDMA) modules, Bluetooth modules, network interface cards (NIC), Wi-Fi modules, dial-up modules, Integrated Services Digital Network (ISDN) modules, Digital Subscriber Line (DSL) modules, and cable modules. In one example, the communication module 216 may also include one or more antennas to enable wireless transmission and reception of data and signals. The communication module 216 may allow the system 100 to transmit data and signals to one or more other devices, such as the OT assets 202, the network devices 204, and the supervisor device 206; and receive data and signals from the one or more other devices.

The engine(s) 102 may include the data acquisition engine 106, the anomaly detection engine 108, the threat analysis engine 110, the alert generation engine 112, and the other engine(s) 114, as explained with reference to FIG. 1. In an example, the engine(s) 102 may further include a model training engine 218.

The data 104 may include the operation data 116, the IT data 118, and the other data 120, as explained with reference to FIG. 1. In an example, the data 104 may further include ideal operation data 220 and historical cyberattack data 222. In an example, the ideal operation data 220 may indicate ideal operating parameter values with which the assets 202 operate during normal operation when any adversary is not accessing a communication network of the organization. In an example, the ideal operation data 220 may be obtained from the assets 202 and then be stored in the memory 214 of the system 100. The historical cyberattack data 222 may indicate historical perturbation patterns of assets and network devices during each of a plurality of historic cyberattacks that have occurred in past. Further, the historical cyberattack data may indicate preventive actions that have ability to prevent the historic cyberattack. In an example, the historical cyberattack data 222 may be obtained from global databases that may include data related to various cyberattacks that have occurred in past.

In operation, for enabling detection of anomalies within the OT environment, the model training engine 218 of the system 100 may be configured to train an anomaly detection model. The anomaly detection model may be an AI model that can identify patterns in data provided for training to use such patterns for detection of the anomalies during operations of the assets 202 within the OT environment of the organization. The anomaly detection model may be trained for each asset 202 within the OT environment.

In an example, for training the anomaly detection model, the model training engine 218 may obtain ideal operation data corresponding to the asset 202. The ideal operation data may be indicative of different ideal operating parameter values associated with the asset. Further, the ideal operation data may be indicative of corresponding time at which the different ideal operating parameter values are obtained. The ideal operating parameter values may be defined as values of operating parameters related to the asset 202. For example, if the asset 202 is the server 202-3, the ideal operating parameter values may include values of operating parameters such as an average load of the server 202-3, a minimum load of the server 202-3, a maximum load of the server 202-3, and an average operating cycle of the server 202-3. The ideal operating parameter values may be obtained during normal operation of the asset 202 when any adversary is not accessing the communication network of the organization. Different assets 202 may be associated with different operating parameters. Thus, the anomaly detection model may be trained separately for each asset 202 using separate ideal operation data. In one example, the ideal operation data may be stored as the ideal operation data 220.

Once the ideal operation data is obtained, the model training engine 218 may analyze the ideal operation data to identify an ideal operating pattern of the asset 202. The ideal operating pattern of the asset 202 may indicate how the asset 202 operates at different times. The model training engine 218 may obtain the anomaly detection model based on training on the ideal operating pattern. The anomaly detection model may then be utilized for quickly and efficiently detecting anomalies within the OT environment by monitoring whether the asset 202 deviates from the ideal operating pattern of the asset 202. The anomaly detection model may detect the anomalies even if there is a small deviation from the ideal operating pattern of the asset 202.

For enabling detection of security threats within the OT environment based on the detected anomalies and enabling alert generation regarding the security threats, the model training engine 218 of the system 100 may be configured to train a threat analysis model. The threat analysis model may be a generative AI model that can identify patterns in data provided for training to use such patterns for detection of the security threats and for the alert generation during operations of the assets 202 within the OT environment of the organization.

In an example, for training the threat analysis model, the model training engine 218 may obtain historical cyberattack data corresponding to each of a plurality of historic cyberattacks. In an example, the historical cyberattack data may be obtained from global databases that may include data related to various cyberattacks that have occurred in past. The historical cyberattack data for each historic cyberattack may include historical operation data of assets operating in OT environments of one or more organizations affected during the historic cyberattack. The historical operation data may be indicative of values of operating parameters associated with the assets operating in the OT environments during the historic cyberattack. Further, the historical cyberattack data for each historic cyberattack may include historical IT data of the assets and network devices operating within communication networks of the one or more organizations at the time of the historic cyberattack. The historical IT data may be indicative of network access and activity logs associated with the communication networks of the one or more organizations. In one example, the historical cyberattack data may be stored as the historical cyberattack data 222.

Once the historical cyberattack data is obtained, the model training engine 218 may analyze the historical cyberattack data for each historic cyberattack. The historical cyberattack data may be analyzed to determine perturbation pattern data. The perturbation pattern data may indicate a perturbation pattern of the assets and the network devices during the historic cyberattack.

The model training engine 218 may obtain an initial version of the threat analysis model based on training on the perturbation pattern data corresponding to the plurality of historic cyberattacks. The initial version of the threat analysis model may be utilized for quickly and efficiently detecting security threats whenever any anomaly is detected in the OT environment. The initial version of the threat analysis model may detect the security threats by monitoring whether the assets 202 and the network devices 204 are operating in an unusual manner that is similar to patterns observed in any of the plurality of historic cyberattacks.

For enabling alert generation including recommendation for preventing cyberattacks, the model training engine 218 may obtain analysis data for each historic cyberattack. The analysis data may indicate preventive actions that have ability to prevent the historic cyberattack. In an example, the analysis data may be obtained from the global databases that may include data related to various cyberattacks that have occurred in past. In another example, the analysis data may be generated based on inputs from subject matter experts who may have analyzed the historic cyberattack to devise the preventive actions.

Once the analysis data is obtained, the model training engine 218 may analyze the preventive actions to obtain a fine-tuned version of the threat analysis model. The fine-tuned version of the threat analysis model may be utilized for generating alerts having effective recommendations for quickly preventing any cyberattack on the communication network before any data or device of the organization is maliciously affected.

For utilizing the anomaly detection model to detect anomalies during active operation of the assets 202, the data acquisition engine 106 may obtain operation data corresponding to an asset 202 operating within the OT environment of the organization. The operation data may be indicative of one or more operating parameter values associated with the asset 202. The operation data may further be indicative of a timing information indicating a particular time at which the one or more operating parameter values are obtained. In an example, the operation data may be obtained from the asset 202 operating within the OT environment. In another example, the operation data may be obtained from a centralized server, say the server 202-3, managing operations performed within the OT environment of the organization. The operation data may be obtained for monitoring of the one or more operating parameter values to enable detection of the anomalies. In one example, the operation data may be stored as the operation data 116.

Once the operation data is obtained, the anomaly detection engine 108 may process the operation data to detect any anomaly in the one or more operating parameter values. In an example, the anomaly detection engine 108 may implement the anomaly detection model to process the operation data. In an example, an anomaly may be detected whenever any of the one or more operating parameter values deviate from the ideal operating parameter values corresponding to the asset 202.

Subsequently, the threat analysis engine 110 may obtain IT data corresponding to the organization upon detecting an anomaly in at least one of the one or more operating parameter values. The IT data may include the network access and activity logs associated with the communication network of the organization. The network access and activity logs may be defined as access attempt details and activity details related to the assets 202 in the OT environment and the network devices 204 connected to the communication network of the organization. For instance, the network access and activity logs may include details of an activity where a rarely seen remote user made unusual changes to operating parameters of the asset 202. The network access and activity logs may also include details of an access attempt where a log-in attempt was made to a particular application that controls critical operations of the organization. In an example, the IT data may be stored as the IT data 118.

In an example, the IT data may be obtained for a pre-defined time window around the particular time. In an example, the pre-defined time window may be decided by a user as a fixed time preceding and succeeding the particular time at which the anomaly has been detected. In an example, the pre-defined time window may be initially set as a default value and may be dynamically modified later according to the situation at hand. For example, the pre-defined time window may be initially set to thirty minutes and may be changed if no logs in the IT data can be correlated to the anomaly. Thus, if the anomaly is detected at a time X, then the IT data may be fetched for thirty minutes before the time X in case of real-time threat detection. In case the threat detection is not real-time, then the IT data may be fetched for thirty minutes before and after the time X.

Once the IT data is obtained, the threat analysis engine 110 may process the operation data and the IT data to ascertain possibility of a cyberthreat event. The possibility of a cyberthreat event may be ascertained based on a correlation between the anomaly and an unusual activity detected in the network access and activity logs. For example, the unusual activity may be a system update performed using a dormant user account few minutes before the time of occurrence of the anomaly. In an example, the threat analysis engine 110 may implement the threat analysis model to obtain the IT data and process the operation data with the IT data. In an example, a possibility of a cyberthreat event may be ascertained whenever the correlation between the anomaly and the unusual activity is found to be similar to any patterns followed during the historic cyberattacks.

In an example, for processing the operation data and the IT data, the threat analysis engine 110 may analyze the operation data and the IT data to identify a perturbation pattern of the asset 202 and the network devices 204 connected to the communication network. Further, the threat analysis engine 110 may compare the perturbation pattern with historical perturbation patterns related to one or more historic cyberattacks to ascertain the possibility of the cyberthreat event. The possibility of the cyberthreat event may be ascertained when the perturbation pattern is found to be similar to any of the historical perturbation patterns or similar to a combination of any of the historical perturbation patterns.

Subsequently, the alert generation engine 112 may analyze the correlation to generate an alert upon ascertaining a possibility of a cyberthreat event. The alert may include one or more recommendations for preventing a cyberattack on the communication network. In an example, the alert generation engine 112 may implement the threat analysis model to generate the alert. Thus, in an example, a recommendation may be provided based on the preventive actions indicated by the historical cyberattack data.

In an example, for analyzing the correlation, the alert generation engine 112 may determine a degree of similarity between the perturbation pattern and a historical perturbation pattern corresponding to each of the one or more historic cyberattacks. Further, the alert generation engine 112 may identify at least one historic cyberattack, from the one or more historic cyberattacks, that is associated with the historical perturbation pattern determined to have the degree of similarity above a threshold similarity level. In an example, the threshold similarity level may be pre-defined by a subject matter expert. In another example, the threshold similarity level may be defined by the threat analysis model based on training on the historical cyberattack data. The alert generation engine 112 may obtain preventive actions having ability to prevent the at least one historic cyberattack. Further, the alert generation engine 112 may determine the recommendation based on the preventive actions. By analyzing the degree of similarity, the alert generation engine 112 may efficiently identify the most relevant historic cyberattacks for the scenario of the organization that is under consideration. Thus, the alert generation engine 112 may efficiently generate a most relevant recommendation for preventing the cyberattack.

In an example, the alert generation engine 112 may assign a severity index to the cyberthreat event based on the degree of similarity. Further, the alert generation engine 112 may incorporate the severity index into the alert for transmission to a supervisor on the supervisor device 206. Thus, the alert generated by the alert generation engine 112 enables the supervisor to prioritize most critical alerts and prevent the cyberattack before any data or device of the organization is maliciously affected.

In an example, the alert generation engine 112 may obtain a visual representation of the anomaly. Further, the alert generation engine 112 may incorporate the visual representation into the alert for transmission to a supervisor on the supervisor device 206. Thus, the alert generated by the alert generation engine 112 enables the supervisor to visualize and quickly gauge the difference between ideal operation of the asset 202 and anomalous operation of the asset 202, enabling the supervisor to initiate preventive actions in a timely manner.

The alert may enable a supervisor to proactively engage in adversary pursuit and threat hunting. The described approaches not only efficiently and quickly detect a cyberthreat, but also provide recommendations for preventing the cyberattack by automatically identifying a root cause of the anomaly based on the correlation. The described approaches provide a simple and robust analytical methodology for early, quick, efficient, and automated detection of cyberthreat events in the OT environment.

Figure 3:
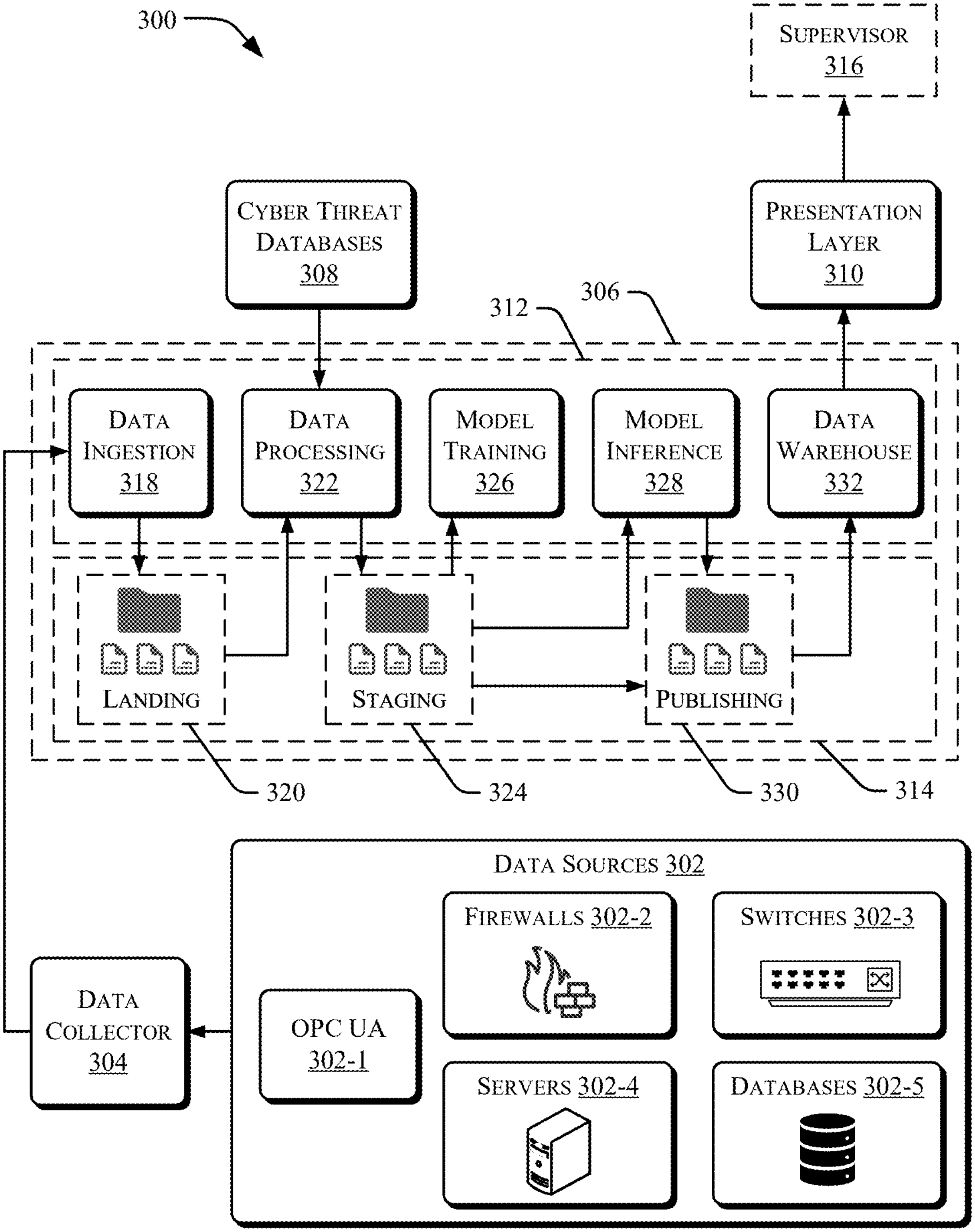
FIG. 3 illustrates an architecture of the system for detecting a security threat in an OT environment, according to an example.

FIG. 3 illustrates an architecture 300 implementing the system 100 for detecting a security threat in an OT environment, according to an example. The architecture 300 is not intended to be construed as a limitation for implementation of the system 100, and it should be understood to a person skilled in the art that the system 100 may be implemented according to an alternative architecture.

The architecture 300 includes data sources 302, data collector 304, a platform 306, cyber threat databases 308, and a presentation layer 310. In an example, the data sources 302 may include the assets 202 and the network devices 204, explained with reference to FIG. 2A and FIG. 2B. In an example, the data sources 302 may be connected to a communication network of a particular organization. The data sources 302 may enable implementation of the system 100 by acting as a source of data, such as the operation data 116, the IT data 118, the ideal operation data 220, the historical cyberattack data 222, and the analysis data, explained with reference to FIG. 1, FIG. 2A, and FIG. 2B. Examples of the data sources 302 may include, but are not limited to, an open platform communications unified architecture (OPC UA) 302-1, firewalls 302-2, switches 302-3, servers 302-4, and databases 302-5.

In one example, the data collector 304 may be a distributed computing system having one or more physical computing systems geographically distributed at same or different locations. In another example, one or more components of the data collector 304 may be hosted virtually, for example, on a cloud-based platform, while other components may be geographically distributed at same or different locations. In yet another example, the data collector 304 may be a stand-alone physical system geographically located at a particular location. In an example, the data collector 304 may be configured to fetch operation data from the data sources 302 and provide relevant data, from the operation data, to the platform 306 for implementation of the system 100.

In an example, the platform 306 may be a cloud-based platform implementing the system 100. In another example, the platform 306 may be any computing platform having processing and storage capabilities for implementing the system 100. In an example, the platform 306 may include a data intelligence platform 312 and a data storage platform 314. The data intelligence platform 312 may be any platform offering services that enable an organization to develop generative AI applications on the organization's data without sacrificing data privacy and control. The data storage platform 314 may be any platform offering services that enable organizations to store structured data, semi-structured data, unstructured data without transforming or aggregating the data so that the data can be preserved for machine learning purposes.

In an example, the cyber threat databases 308 may be global databases that may include data, such as the historical cyberattack data and the analysis data as explained with reference to FIG. 2A, related to various cyberattacks that have occurred in past. In an example, the presentation layer 310 may be configured to build a user interface for presenting a visual representation of the alert to a supervisor 316 on a supervisor device.

In operation, for training the system 100 for detecting security threats in an OT environment of the organization, the data collector 304 may collect operation data from the data sources 302. The data collector 304 may filter the operation data to obtain ideal operation data, say the ideal operation data 220 explained with reference to FIG. 2A. Upon receiving a request from the platform 306, the data collector may feed the platform 306 with the ideal operation data for training of the anomaly detection model as explained with reference to FIG. 2A.

The data intelligence platform 312 may include a data ingestion block 318. At the data ingestion block 318, the ideal operation data may be collected from the data collector 304 and loaded into the platform 306. In an example, the ideal operation data may be pre-preprocessed or normalized at the data ingestion block 318 for further processing. The data storage platform 314 may include a landing block 320. At the landing block 320, the ideal operation data, e.g., after normalization or pre-processing, may be stored in the data storage platform 314 for further processing.

The data intelligence platform 312 may further include a data processing block 322. At the data processing block 322, the ideal operation data may be fetched from the landing block 320. Further, at the data processing block 322, the historical cyberattack data and the analysis data may be obtained from the cyber threat databases 308. At the data processing block 322, the ideal operation data may be processed and analyzed to identify ideal operating patterns of the assets 202 operating within the OT environment of the organization. Further, at the historical cyberattack data may be processed and analyzed to determine perturbation pattern data indicating perturbation patterns of the assets and the network devices during historic cyberattacks. Further, at the historical cyberattack data, the analysis data may be processed to identify preventive actions that have ability to prevent the historic cyberattacks. The data storage platform 314 may include a staging block 324. At the staging block 324, the ideal operating patterns, the perturbation pattern data, and the preventive actions may be stored in the data storage platform 314 for further processing.

The data intelligence platform 312 may further include a model training block 326 and a model inference block 328. For obtaining the anomaly detection model explained with reference to FIG. 2, at the model training block 326, the ideal operating patterns may be obtained from the staging block 324. The anomaly detection model may be obtained based on training on the ideal operating patterns. Further, for obtaining the threat analysis model explained with reference to FIG. 2, at the model training block 326, the perturbation pattern data and the preventive actions may be obtained from the staging block 324. The threat analysis model may be obtained based on training on the perturbation pattern data and the preventive actions. At the model inference block 328, inference may be generated based on the model training at the model training block 326. The data storage platform 314 may include a publishing block 330. At the publishing block 330, the inference may be stored for use during anomaly and security threat detection and alert generation. The data intelligence platform 312 may further include a data warehouse block 332. At the data warehouse block 332, the inference may be received from the publishing block 330 for detecting anomalies or security threats and for generating security alerts including recommendations for preventing a cyberattack on a communication network of the organization.

For anomaly and security threat detection and alert generation during run-time operation of the organization, the data collector 304 may fetch operation data, say the operation data 116, and feed the operation data into the platform 306 for anomaly detection. When an anomaly is detected in the operation data, the data collector 304 may fetch IT data, say, the IT data 118, and feed the IT data into the platform 306 for threat detection and alert generation. The operation data and the IT data may then be processed and analyzed at the data ingestion block 318 and the data processing block 322 to identify a perturbation pattern. At the staging block 324, the perturbation pattern may be stored in the data storage platform 314 for model inference. Based on the perturbation pattern and historical perturbations patterns, at the data warehouse block 332, an alert may be generated upon ascertaining a possibility of a cyberthreat event at the model inference block 328. The alert may include a recommendation for preventing a cyberattack. In an example, a query resolution model, such as a large language model (LLM), and a data retrieval model, such as a retrieval augmented generation (RAG) model, may be utilized for providing the recommendation to the supervisor in natural language. At the presentation layer 310, a user interface may be built for presenting the generated alert to the supervisor 316. The supervisor 316 may accordingly proactively engage in cyberattack prevention based on the recommendation.

Figure 4:
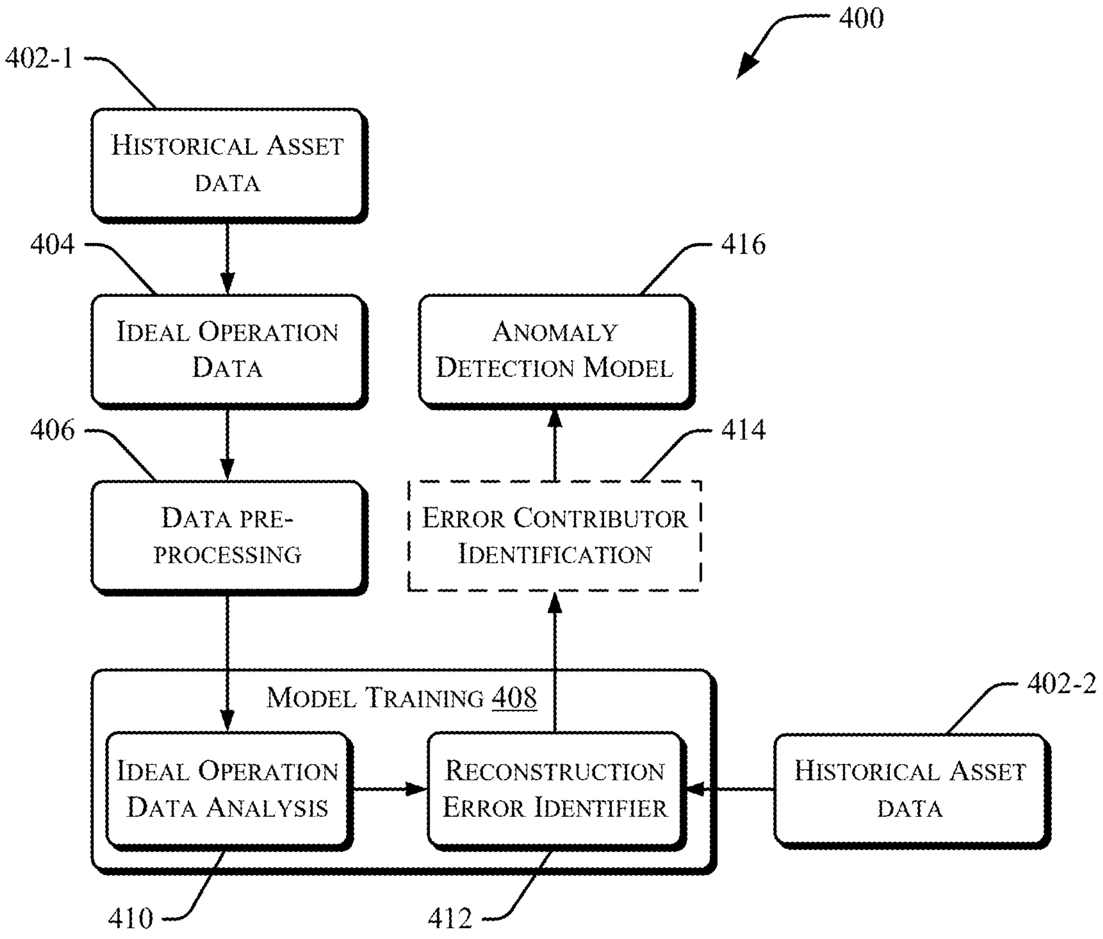
FIG. 4 illustrates a data flow diagram for training of a machine learning model for detecting an anomaly in an OT environment, according to an example.

FIG. 4 illustrates a data flow diagram 400 for training of a machine learning model for detecting an anomaly in an OT environment, according to an example. The order in which the data flow diagram 400 is described is not intended to be construed as a limitation, and some of the described components of the data flow diagram 400 may be combined in a different order to implement a data flow according to the data flow diagram 400, or an alternative data flow.

The data flow in the data flow diagram 400 may be implemented in a suitable hardware, computer-readable instructions, or combination thereof. The steps of such data flow diagram 400 may be performed by either a system under the instruction of machine executable instructions stored on a non-transitory computer-readable medium or by dedicated hardware circuits, microcontrollers, or logic circuits. For example, the data flow in the data flow diagram 400 may be performed by components of the system 100. In an implementation, the data flow of the data flow diagram 400 may be performed under an "as a service" delivery model, where the system 100 operated by a provider, may receive a programmable code. Herein, some examples are also intended to cover non-transitory computer-readable medium, for example, digital data storage media, which are computer-readable and encode computer-executable instructions, where said instructions perform some or all the steps of the data flow of the data flow diagram 400.

In one example implementation, the data flow diagram 400 of FIG. 4 illustrates historical asset data 402-1 and 402-2. In an example, the historical asset data 402-1 and 402-2 may be indicative of different historical operating parameter values associated with assets operating within the OT environment and corresponding time at which the different historical operating parameter values are obtained. In an example, the historical asset data 402-1 and the historical asset data 402-2 may be divided from a historical asset dataset such that the historical asset data 402-1 and the historical asset data 402-2 may be associated with different timings. The historical asset data 402-1 may be utilized for training of an anomaly detection model. The historical asset data 402-2 may be utilized for testing of the anomaly detection model. Ideal operation data 404, say the ideal operation data 220 explained with reference to FIG. 2A, may be derived from the historical asset data 402-1. The ideal operation data 404 may indicate ideal operating parameter values with which the assets operate during normal operation when any adversary is not accessing a communication network of the organization.

The data flow diagram 400 illustrates a block 406 for data pre-processing. At block 406, the ideal operation data 404 may be pre-processed. In an example, the ideal operation data 404 may also be normalized at block 406.

The data flow diagram 400 illustrates a block 408 for model training. The ideal operation data 404 after normalization and pre-processing, and the historical asset data 402-2 may be fed to the block 408 for model training. In an example, the historical asset data 402-2 may also be pre-processed or normalized before being fed to the block 408 for model training.

The block 408 for model training includes an ideal operation data analysis block 410 and a reconstruction error identifier block 412. At the ideal operation data analysis block 410, ideal operating patterns may be determined for the assets using the pre-processed ideal operation data. An ideal operating pattern for an asset may indicate typical patterns in operating parameters of the asset according to different times. The ideal operating patterns may be utilized for training the anomaly detection model.

At the reconstruction error identifier block 412, the anomaly detection model, trained based on the ideal operating patterns, may be tested using the historical asset data 402-2 to identify reconstruction errors. If any reconstruction errors are identified, at the error contributor identification block, contributors of the reconstruction errors may be identified, and the anomaly detection model may be improvised to mitigate the reconstruction errors and generate a trained version of the anomaly detection model 416. If any reconstruction errors are not identified at the reconstruction error identifier block 412, the anomaly detection model 416 may be obtained after model training without moving to the error contributor identification block 414. In an example, the anomaly detection model 416 may be an AI model. The trained anomaly detection model may then be utilized for detecting anomalies within the OT environment during run-time operation.

Figure 5:
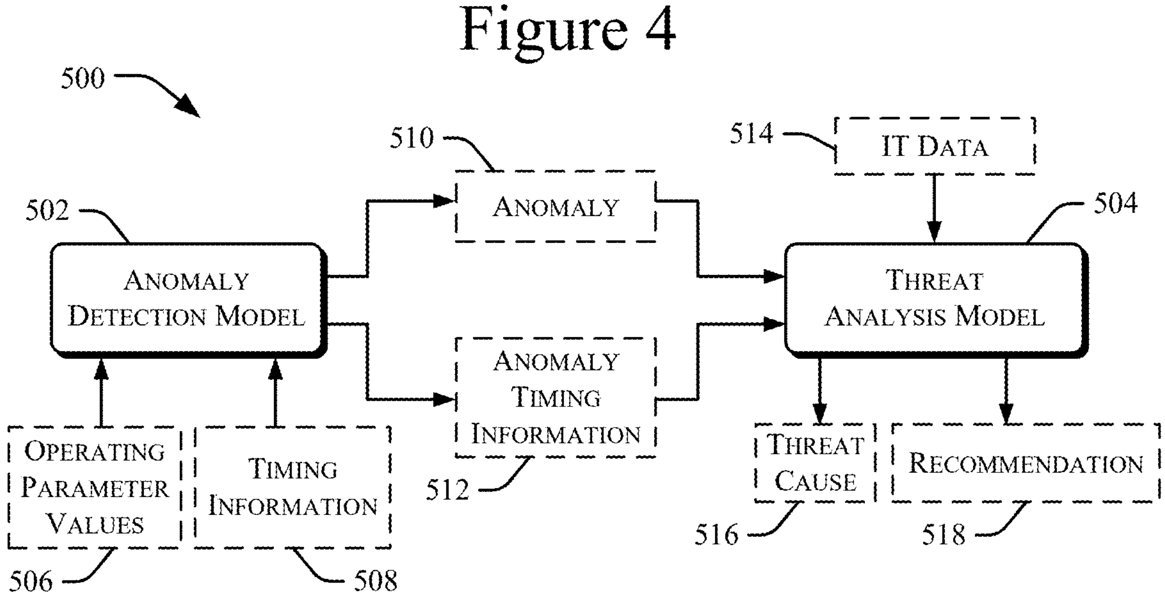
FIG. 5 illustrates a data flow diagram for detecting a security threat in an OT environment, according to an example.

FIG. 5 illustrates a data flow diagram 500 for detecting a security threat in an OT environment, according to an example. The order in which the data flow diagram 500 is described is not intended to be construed as a limitation, and some of the described components of the data flow diagram 500 may be combined in a different order to implement a data flow according to the data flow diagram 500, or an alternative data flow.

The data flow in the data flow diagram 500 may be implemented in a suitable hardware, computer-readable instructions, or combination thereof. The steps of such data flow diagram 500 may be performed by either a system under the instruction of machine executable instructions stored on a non-transitory computer-readable medium or by dedicated hardware circuits, microcontrollers, or logic circuits. For example, the data flow in the data flow diagram 500 may be performed by components of the system 100. In an implementation, the data flow of the data flow diagram 500 may be performed under an "as a service" delivery model, where the system 100 operated by a provider, may receive a programmable code. Herein, some examples are also intended to cover non-transitory computer-readable medium, for example, digital data storage media, which are computer-readable and encode computer-executable instructions, where said instructions perform some or all the steps of the data flow of the data flow diagram 500.

The data flow diagram 500 of FIG. 5 illustrates an anomaly detection model 502 and a threat analysis model 504. In an example, the anomaly detection model 502 may be an artificial intelligence (AI) model trained on ideal operation data of assets operating within the OT environment to detect anomalies within the OT environment during run-time operation. The ideal operation data may indicate ideal operating parameter values with which the assets operate during normal operation when any adversary is not accessing a communication network of the organization.

In an example, the threat analysis model 504 may be a generative AI model trained on historical cyberattack data corresponding to a plurality of historic cyberattacks. The historical cyberattack data may be obtained from global databases that may include data related to various cyberattacks that have occurred in the past. The historical cyberattack data may indicate historical perturbation patterns of assets and network devices during each of the plurality of historic cyberattacks. Further, the historical cyberattack data may indicate preventive actions that have ability to prevent the historic cyberattack.

For detecting anomalies corresponding to an asset, say the asset 202, operating within an OT environment of an organization, the anomaly detection model 502 may obtain operation data corresponding to the asset. The operation data may be indicative of one or more operating parameter values 506 associated with the asset. The operation data may be further indicative of a timing information 508 indicating a particular time at which the one or more operating parameter values 506 are obtained. In an example, the timing information may a data and time stamp indicating the particular time with a particular date. In an example, the anomaly detection model 502 may detect an anomaly whenever any of the one or more operating parameter values 506 deviate from the ideal operating parameter values corresponding to the asset.

Upon detecting an anomaly 510 in at least one of the one or more operating parameter values 506, the anomaly detection model 502 may transmit the detected anomaly 510 and anomaly timing information 512 to the threat analysis model 504. The anomaly timing information 512 may indicate a particular time at which the anomaly 510 started in at least one of the one or more operating parameter values 506.

Upon receiving the anomaly 510 and the anomaly timing information 512, the threat analysis model 504 may obtain IT data 514 corresponding to the organization. The IT data 514 may include the network access and activity logs associated with the communication network of the organization. The IT data 514 may be obtained for a pre-defined time window around the particular time indicated by the anomaly timing information 512. In an example, the pre-defined time window may be decided by a user as a fixed time preceding and succeeding the particular time at which the anomaly 510 has been detected. In an example, the pre-defined time window may be initially set as a default value and may be dynamically modified later according to the situation at hand.

The threat analysis model 504 may process the operation data and the IT data 514 to ascertain possibility of a cyberthreat event. The possibility of a cyberthreat event may be ascertained based on a correlation between the anomaly 510 and an unusual activity detected in the network access and activity logs. For example, the unusual activity may be a system update performed, using a dormant or an unauthorized user account, just ten minutes before the time of occurrence of the anomaly 510. In an example, a possibility of a cyberthreat event may be ascertained whenever perturbation pattern defined by the correlation between the anomaly and the unusual activity is found to be similar to any of the historical perturbation patterns.

Subsequently, the threat analysis model 504 may analyze the correlation to generate an alert upon ascertaining a possibility of a cyberthreat event. In an example, the alert may include a threat cause 516 indicating a root cause of the cyberthreat event. The root cause may be identified based on the correlation between the anomaly 510 and the unusual activity in the IT data 514. In an example, the alert may include a recommendation 518 for preventing a cyberattack on the communication network. In an example, the recommendation 518 may be provided based on the preventive actions indicated by the historical cyberattack data. The alert may enable a supervisor to proactively engage in adversary pursuit and threat hunting. Thus, the described approaches not only efficiently and quickly detect a cyberthreat, but also provide recommendations for preventing the cyberattack by automatically identifying a root cause of the anomaly 510 based on the correlation. The described approaches provide a simple and robust analytical methodology for early, quick, efficient, and automated detection of cyberthreat events in the OT environment.

FIG. 6, FIG. 7, FIG. 8, FIG. 9A, FIG. 9B, and FIG. 9C illustrate example methods 600, 700, 800, 900, 910, and 914, respectively, for detecting a security threat in an OT environment and training of a machine learning model for detecting an anomaly and a security threat in an OT environment. The order in which the methods are described is not intended to be construed as a limitation, and any number of the described method blocks may be combined in any order to implement the methods, or an alternative method. Further, the methods 600, 700, 800, 900, 910, and 914 may be implemented by processing resource or computing device(s) through any suitable hardware, non-transitory machine-readable instructions, or combination thereof.

It may also be understood that methods 600, 700, 800, 900, 910, and 914 may be performed by programmed computing devices, such as the system 100, as depicted in FIG. 1, FIG. 2A, and FIG. 2B. Furthermore, the methods 600, 700, 800, 900, 910, and 914 may be executed based on instructions stored in a non-transitory computer-readable medium, as will be readily understood. The non-transitory computer-readable medium may include, for example, digital memories, magnetic storage media, such as one or more magnetic disks and magnetic tapes, hard drives, or optically readable digital data storage media. While the methods 600, 700, 800, 900, 910, and 914 are described below with reference to the system 100 as described above; other suitable systems for the execution of these methods may also be utilized. Additionally, implementation of the methods 600, 700, 800, 900, 910, and 914 is not limited to such examples.

Figure 6:
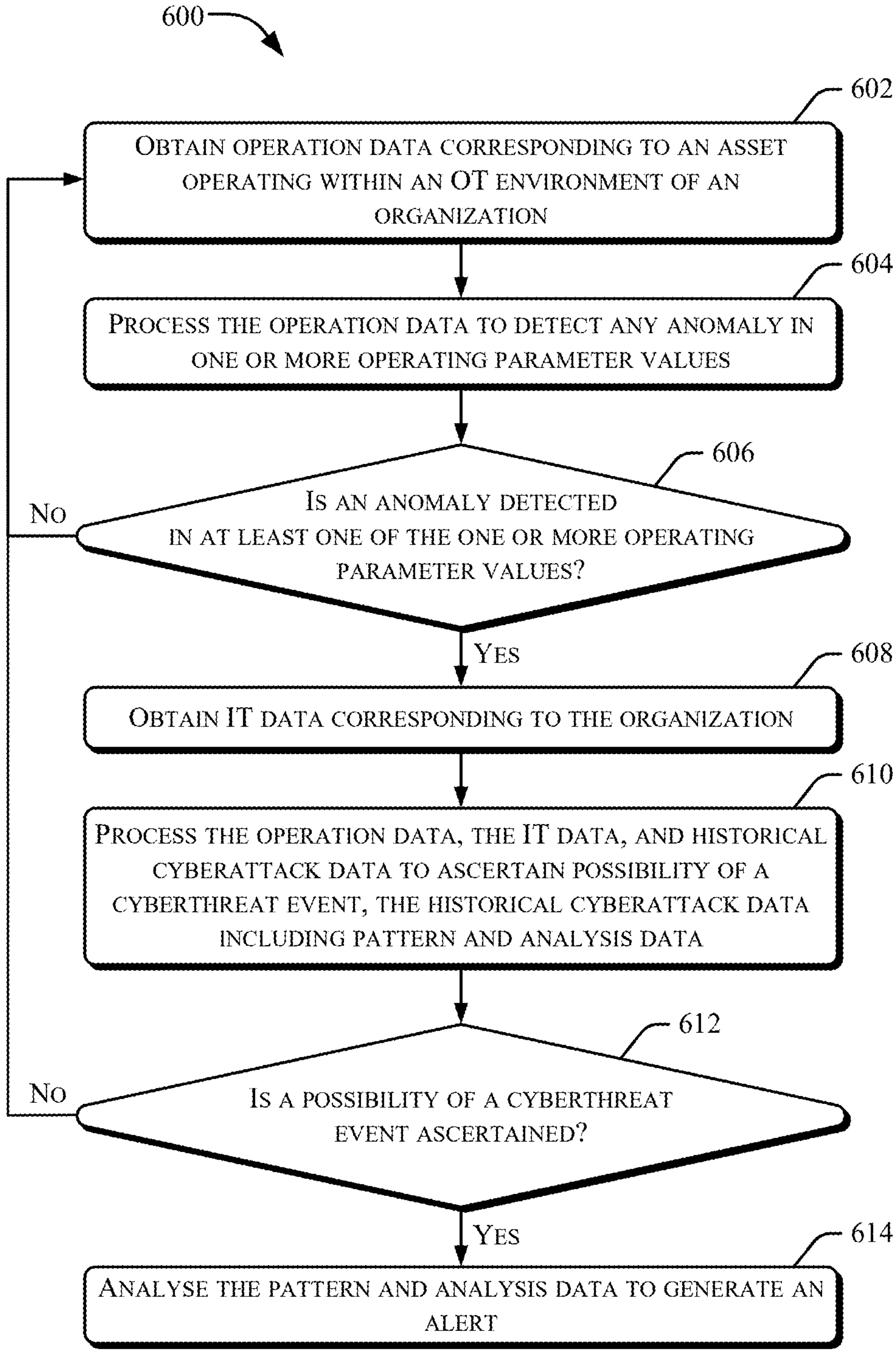
FIG. 6 illustrates a method for detecting a security threat in an OT environment, according to an example.

FIG. 6 illustrates the method 600 for detecting a security threat in an OT environment of an organization, according to an example.

At block 602, operation data corresponding to an asset, say the asset 202, operating within the OT environment may be obtained. The operation data may be indicative of one or more operating parameter values associated with the asset. Further, the operation data may be indicative of a timing information. The timing information may indicate a particular time at which the one or more operating parameter values are obtained. In an example, the asset may be a device, a system, or a machine associated with the organization. In an example, the operation data may be obtained from the asset operating within the OT environment. In another example, the operation data may be obtained from a centralized server, say the server 202-3, managing operations of assets operating within the OT environment of the organization.

At block 604, the operation data may be processed to detect any anomaly in the one or more operating parameter values. In an example, an anomaly detection model may be utilized for processing the operation data. The anomaly detection model may be an AI model trained on ideal operation data of the assets to detect anomalies within the OT environment. The ideal operation data may indicate ideal operating parameter values with which the assets operate during normal operation when any adversary is not accessing a communication network of the organization. In an example, an anomaly may be detected whenever any of the one or more operating parameter values deviate from the ideal operating parameter values corresponding to the asset.

At block 606, it is determined whether an anomaly is detected in at least one of the one or more operating parameter values. If any anomaly is not detected in the one or more operating parameter values, the method may move back to block 602 and the operation data may be continuously obtained and processed.

Upon detecting an anomaly in at least one of the one or more operating parameter values, at block 608, information technology (IT) data corresponding to the organization may be obtained. The IT data may include the network access and activity logs associated with a communication network of an organization. The network access and activity logs may be defined as access attempt details and activity details related to the assets in the OT environment and all other network devices connected to the communication network of the organization. In an example, the IT data may be obtained for a pre-defined time window around the particular time. In an example, the pre-defined time window may be decided by a user as a fixed time preceding and succeeding the particular time at which the anomaly has been detected. In an example, the pre-defined time window may be initially set as a default value and may be dynamically modified later according to the situation at hand. For example, the pre-defined time window may be initially set to thirty minutes and may be changed if no logs in the IT data can be correlated to the anomaly. Thus, if the anomaly is detected at a time X, then the IT data may be fetched for thirty minutes before the time X in case of real-time threat detection. In case the threat detection is not real-time, then the IT data may be fetched for thirty minutes before and after the time X.

At block 610, the operation data, the IT data, and historical cyberattack data may be processed to ascertain possibility of a cyberthreat event. The historical cyberattack data may include pattern and analysis data related to each of one or more historic cyberattacks. In an example, the historical cyberattack data may be obtained from global databases that may include data related to various cyberattacks that have occurred in the past. The pattern and analysis data may indicate historical perturbation patterns of assets and network devices during each of the one or more historic cyberattacks. Further, the pattern and analysis data may indicate preventive actions that have ability to prevent the historic cyberattack.

In an example, for processing the operation data, the IT data, and the historical cyberattack data, the operation data and the IT data may be analyzed to identify a perturbation pattern of the asset and network devices connected to the communication network. Further, the historical perturbation patterns related to the one or more historic cyberattacks may be extracted from the pattern and analysis data. The perturbation pattern may then be compared with the historical perturbation patterns to ascertain the possibility of the cyberthreat event. In an example, a possibility of a cyberthreat event may be ascertained whenever the perturbation pattern is found to be similar to any of the historical perturbation patterns or similar to a combination of any of the historical perturbation patterns.

At block 612, it is determined whether a possibility of a cyberthreat event is ascertained. If any possibility of a cyberthreat event is not ascertained, the method may move back to block 602 and the operation data may be continuously obtained and processed.

Upon ascertaining a possibility of a cyberthreat event, at block 614, the pattern and analysis data may be analyzed to generate an alert. In an example, a threat analysis model may be utilized for analyzing the pattern and analysis data and generating the alert. The alert may include one or more recommendations for preventing a cyberattack on the communication network. In an example, a recommendation may be provided based on the preventive actions indicated by the pattern and analysis data.

In an example, for analyzing the pattern and analysis data, a degree of similarity may be determined between the perturbation pattern and a historical perturbation pattern corresponding to each of the one or more historic cyberattacks Further, at least one historic cyberattack, that is associated with the historical perturbation pattern determined to have the degree of similarity above a threshold similarity level, may be identified from the one or more historic cyberattacks. In an example, the threshold similarity level may be pre-defined by a subject matter expert. In another example, the threshold similarity level may be defined by the threat analysis model based on training on the historical cyberattack data. Preventive actions having ability to prevent the at least one historic cyberattack may then be obtained and the recommendation may be determined based on the preventive actions. By analyzing the degree of similarity, the most relevant historic cyberattacks may be efficiently identified for the scenario of the organization that is under consideration. Thus, a most relevant recommendation may be efficiently generated for preventing the cyberattack. The alert may enable a supervisor to proactively engage in adversary pursuit and threat hunting. The method 600 is a simple and robust analytical methodology for early, quick, efficient, and automated detection of cyberthreat events in the OT environment.

Figure 7:
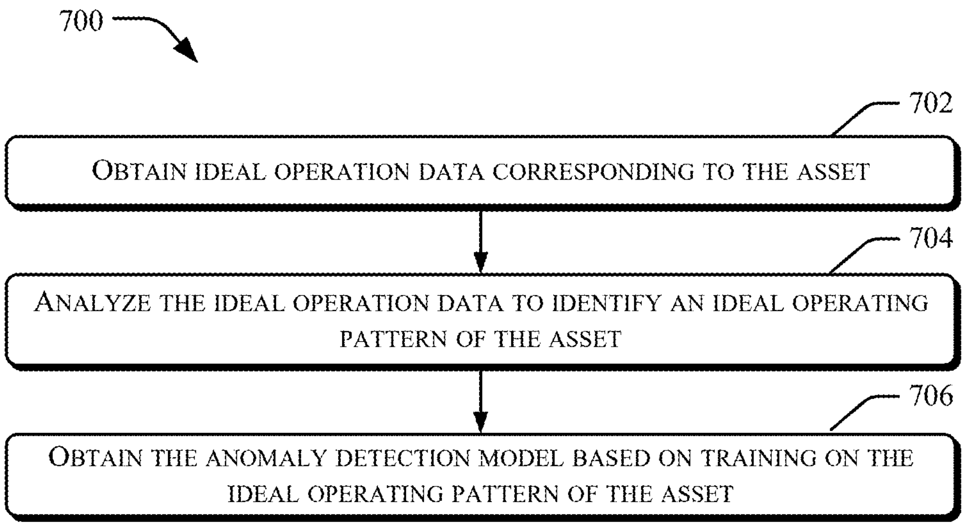
FIG. 7 illustrates a method for training of a machine learning model for detecting an anomaly in an OT environment, according to an example.

FIG. 7 illustrates the method 700 for training of a machine learning model for detecting an anomaly in an OT environment of an organization, according to an example.

At block 702, ideal operation data may be obtained corresponding to an asset, say the asset 202. The ideal operation data may be indicative of different ideal operating parameter values associated with the asset. Further, the ideal operation data may be indicative of corresponding time at which the different ideal operating parameter values are obtained. The ideal operating parameter values may be defined as values of operating parameters related to the asset. For example, if the asset is the server, say the server 202-3, the ideal operating parameter values may include values of operating parameters such as an average load of the server, a minimum load of the server, a maximum load of the server, and an average operating cycle of the server. The ideal operating parameter values may be obtained during normal operation of the asset when any adversary is not accessing a communication network of the organization.

At block 704, the ideal operation data may be analyzed to identify an ideal operating pattern of the asset. The ideal operating pattern of the asset may indicate how the asset operates at different times.

Subsequently, at block 706, an anomaly detection model may be obtained based on training on the ideal operating pattern. The anomaly detection model may then be utilized for quickly and efficiently detecting anomalies within the OT environment by monitoring whether the asset deviates from the ideal operating pattern of the asset. The anomaly detection model may detect the anomalies even if there is a small deviation from the ideal operating pattern of the asset. Different assets may be associated with different operating parameters. Thus, the anomaly detection model may be trained separately for each asset using separate ideal operation data. The anomaly detection model may be an AI model that can identify patterns in data provided for training to use such patterns for detection of the anomalies during operations of assets within the OT environment of the organization.

Figure 8:
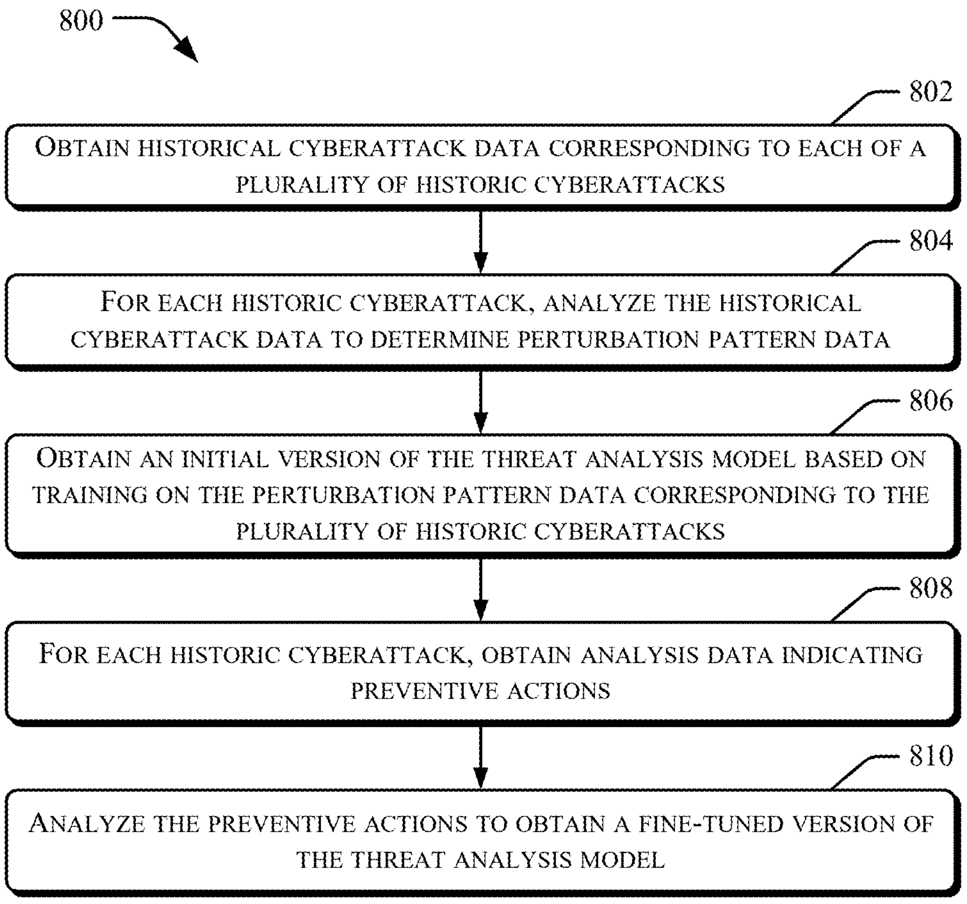
FIG. 8 illustrates a method for training of a machine learning model for detecting a security threat in an OT environment, according to an example.

FIG. 8 illustrates the method 800 for training of a machine learning model for detecting a security threat in an OT environment of an organization, according to an example.

At block 802, historical cyberattack data may be obtained corresponding to each of a plurality of historic cyberattacks. In an example, the historical cyberattack data may be obtained from global databases that may include data related to various cyberattacks that have occurred in past. The historical cyberattack data for each historic cyberattack may include historical operation data of assets operating in OT environments of one or more organizations affected during the historic cyberattack. The historical operation data may be indicative of values of operating parameters associated with the assets operating in the OT environments during the historic cyberattack. Further, the historical cyberattack data for each historic cyberattack may include historical IT data of the assets and network devices, say the network devices 204, operating within communication networks of the one or more organizations at the time of the historic cyberattack. The historical IT data may be indicative of network access and activity logs associated with the communication networks of the one or more organizations.

At block 804, the historical cyberattack data may be analyzed for each historic cyberattack. The historical cyberattack data may be analyzed to determine perturbation pattern data. The perturbation pattern data may indicate a perturbation pattern of the assets and the network devices during the historic cyberattack.

Subsequently, at block 806, an initial version of the threat analysis model may be obtained based on training on the perturbation pattern data corresponding to the plurality of historic cyberattacks. The initial version of the threat analysis model may be utilized for quickly and efficiently detecting security threats whenever any anomaly is detected in the OT environment. The initial version of the threat analysis model may detect the security threats by monitoring whether the assets and the network devices are operating in an unusual manner that is similar to patterns observed in any of the plurality of historic cyberattacks.

For enabling alert generation including recommendation for preventing cyberattacks, at block 808, analysis data may be obtained for each historic cyberattack. The analysis data may indicate preventive actions that have ability to prevent the historic cyberattack. In an example, the analysis data may be obtained from the global databases that may include data related to various cyberattacks that have occurred in past. In another example, the analysis data may be generated based on inputs from subject matter experts who may have analyzed the historic cyberattack to devise the preventive actions.

Subsequently, at block 810, the preventive actions may be analyzed to obtain a fine-tuned version of the threat analysis model. The fine-tuned version of the threat analysis model may be utilized for generating alerts having effective recommendations for quickly preventing any cyberattack on the communication network before any data or device of the organization is maliciously affected. The threat analysis model may be a generative AI model that can identify patterns in data provided for training to use such patterns for detection of the security threats and for the alert generation during operations of the assets within the OT environment of the organization.

Figure 9A:
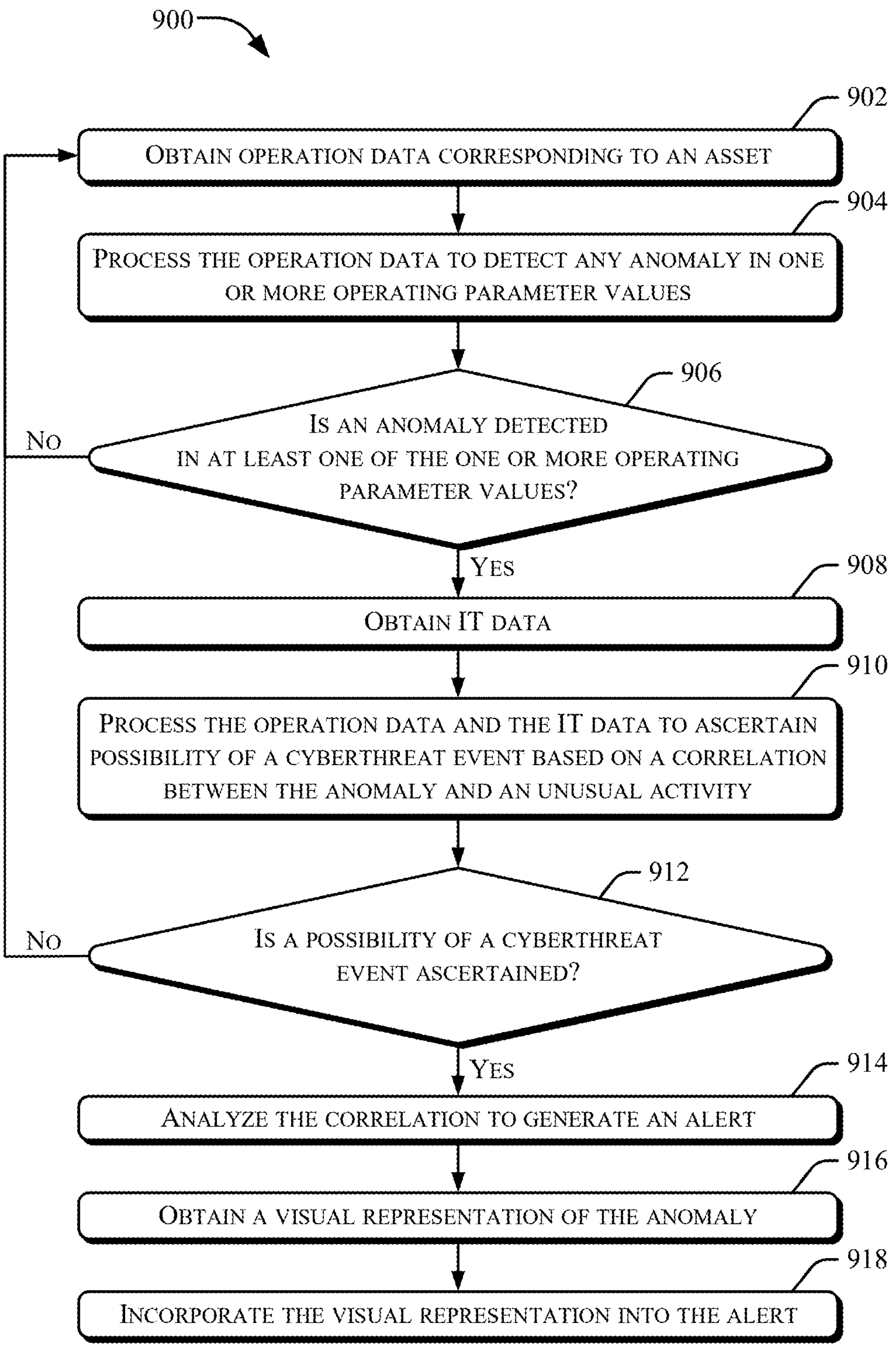
FIG. 9A to FIG. 9C illustrate a method for detecting a security threat in an OT environment, according to another example.

FIG. 9A illustrates the method 900 for detecting a security threat in an OT environment of an organization, according to another example.

At block 902, operation data corresponding to an asset, say the asset 202, operating within the OT environment may be obtained. The operation data may be indicative of one or more operating parameter values associated with the asset. Further, the operation data may be indicative of a timing information. The timing information may indicate a particular time at which the one or more operating parameter values are obtained. In an example, the asset may be a device, a system, or a machine associated with the organization. In an example, the operation data may be obtained from the asset operating within the OT environment. In another example, the operation data may be obtained from a centralized server, say the server 202-3, managing operations of assets operating within the OT environment of the organization.

At block 904, the operation data may be processed to detect any anomaly in the one or more operating parameter values. In an example, an anomaly detection model may be utilized for processing the operation data. The anomaly detection model may be an AI model trained on ideal operation data of the assets to detect anomalies within the OT environment. The ideal operation data may indicate ideal operating parameter values with which the assets operate during normal operation when any adversary is not accessing a communication network of the organization. In an example, an anomaly may be detected whenever any of the one or more operating parameter values deviate from the ideal operating parameter values corresponding to the asset.

At block 906, it is determined whether an anomaly is detected in at least one of the one or more operating parameter values. If any anomaly is not detected in the one or more operating parameter values, the method may move back to block 602 and the operation data may be continuously obtained and processed.

Upon detecting an anomaly in at least one of the one or more operating parameter values, at block 908, information technology (IT) data corresponding to the organization may be obtained. The IT data may include the network access and activity logs associated with a communication network of an organization. The network access and activity logs may be defined as access attempt details and activity details related to the assets in the OT environment and all other network devices connected to the communication network of the organization. In an example, the IT data may be obtained for a pre-defined time window around the particular time. In an example, the pre-defined time window may be decided by a user as a fixed time preceding and succeeding the particular time at which the anomaly has been detected. In an example, the pre-defined time window may be initially set as a default value and may be dynamically modified later according to the situation at hand. For example, the pre-defined time window may be initially set to thirty minutes and may be changed if no logs in the IT data can be correlated to the anomaly. Thus, if the anomaly is detected at a time X, then the IT data may be fetched for thirty minutes before the time X in case of real-time threat detection. In case the threat detection is not real-time, then the IT data may be fetched for thirty minutes before and after the time X.

At block 910, the operation data and the IT data may be processed to ascertain possibility of a cyberthreat event. The possibility of a cyberthreat event may be ascertained based on a correlation between the anomaly and an unusual activity detected in the network access and activity logs. For example, the unusual activity may be a system update performed using a dormant user account few minutes before the time of occurrence of the anomaly. In an example, the threat analysis model may be utilized for obtaining the IT data and processing the operation data with the IT data. In an example, a possibility of a cyberthreat event may be ascertained whenever the correlation between the anomaly and the unusual activity is found to be similar to any patterns followed during the historic cyberattacks.

At block 912, it is determined whether a possibility of a cyberthreat event is ascertained. If any possibility of a cyberthreat event is not ascertained, the method may move back to block 602 and the operation data may be continuously obtained and processed.

Upon ascertaining a possibility of a cyberthreat event, at block 914, the correlation may be analyzed to generate an alert. The alert may include one or more recommendations for preventing a cyberattack on the communication network. In an example, the threat analysis model may be utilized for generating the alert. Thus, in an example, a recommendation may be provided based on the preventive actions indicated by the historical cyberattack data.

In an example, a degree of similarity between the perturbation pattern and the historical perturbation patterns may be determined. Further, a severity index may be assigned to the cyberthreat event based on the degree of similarity. Subsequently, the severity index may be incorporated into the alert for transmission to a supervisor on the supervisor device. Thus, the alert enables the supervisor to prioritize most critical alerts and prevent the cyberattack before any data or device of the organization is maliciously affected.

At block 916, a visual representation of the anomaly may be obtained. Subsequently, at block 918, the visual representation may be incorporated into the alert for transmission to a supervisor on the supervisor device, say the supervisor device 206. Thus, the alert may enable the supervisor to visualize and quickly gauge the difference between ideal operation of the asset and anomalous operation of the asset, enabling the supervisor to initiate preventive actions in a timely manner. The alert may enable a supervisor to proactively engage in adversary pursuit and threat hunting. The method 900 is a simple and robust analytical methodology for early, quick, efficient, and automated detection of cyberthreat events in the OT environment.

Figure 9B:
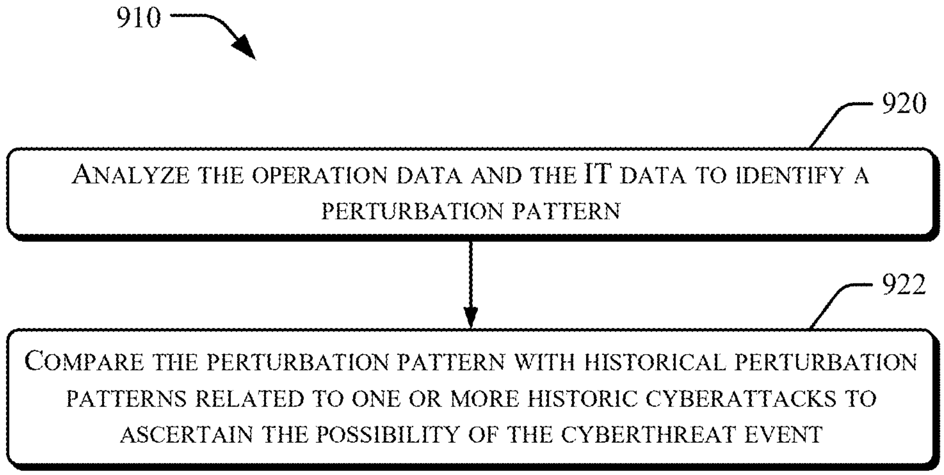

FIG. 9B illustrates the method 910 for processing the operation data and the IT data at block 910 of FIG. 9A, according to an example.

At block 920, the operation data and the IT data may be analyzed to identify a perturbation pattern of the asset and the network devices connected to the communication network. Subsequently, at block 922, the perturbation pattern may be compared with historical perturbation patterns related to one or more historic cyberattacks to ascertain the possibility of the cyberthreat event. The possibility of the cyberthreat event may be ascertained when the perturbation pattern is found to be similar to any of the historical perturbation patterns or similar to a combination of any of the historical perturbation patterns.

Figure 9C:
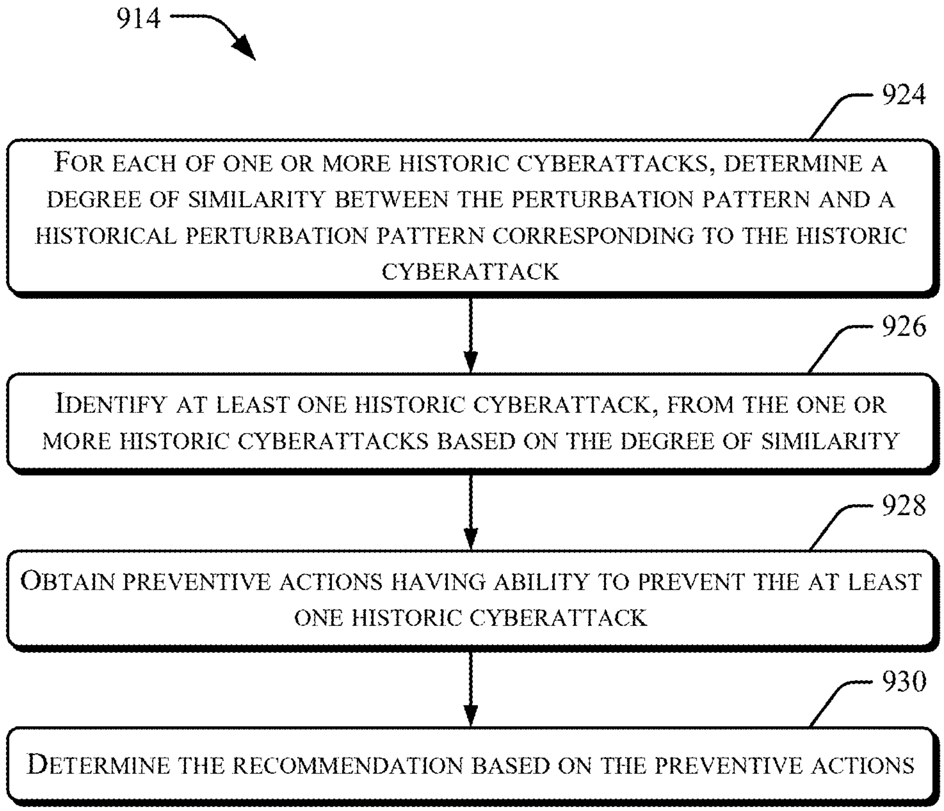

FIG. 9C illustrates the method 914 for analyzing the correlation to generate the alert at block 914 of FIG. 9A, according to an example.

At block 924, a degree of similarity between the perturbation pattern and a historical perturbation pattern corresponding to each of the one or more historic cyberattacks may be determined. Subsequently, at block 926, at least one historic cyberattack may be identified from the one or more historic cyberattacks. The at least one historic cyberattack may be associated with the historical perturbation pattern determined to have the degree of similarity above a threshold similarity level. In an example, the threshold similarity level may be pre-defined by a subject matter expert. In another example, the threshold similarity level may be defined by the threat analysis model based on training on the historical cyberattack data.

At block 928, preventive actions having ability to prevent the at least one historic cyberattack may be obtained. Subsequently, at block 930, the recommendation may be determined based on the preventive actions. By analyzing the degree of similarity, the most relevant historic cyberattacks may be efficiently identified for the scenario of the organization that is under consideration. Thus, a most relevant recommendation may be efficiently generated for preventing the cyberattack.

Figure 10:
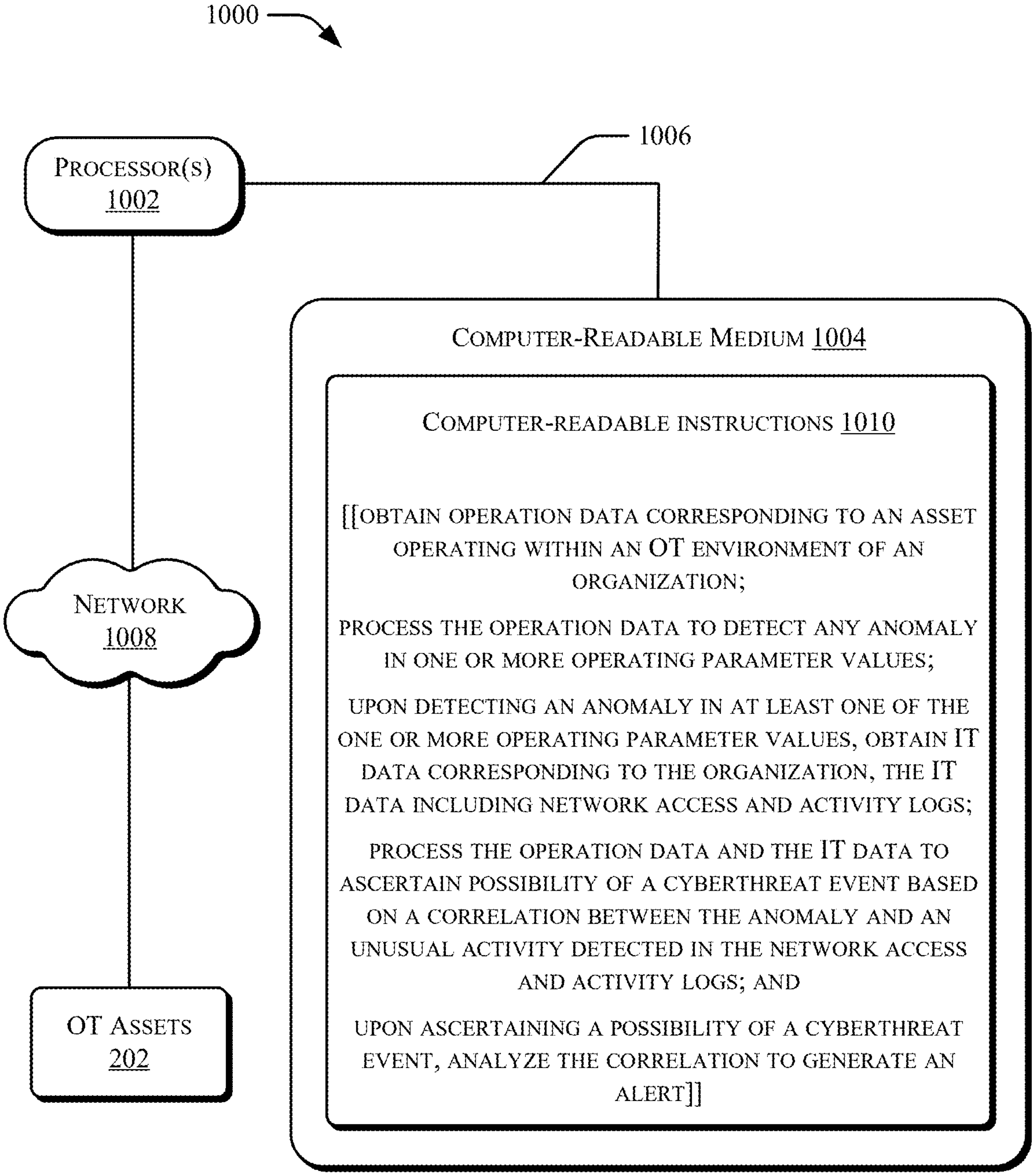
FIG. 10 illustrates a computing environment implementing a non-transitory computer-readable medium for detecting a security threat in an OT environment, according to an example.

FIG. 10 illustrates a computing environment 1000 implementing a non-transitory computer-readable medium for detecting a security threat in an OT environment, according to an example. In an example, the computing environment 1000 includes processor(s) 1002 communicatively coupled to a non-transitory computer-readable medium 1004 through a communication link 1006. In one example, the communication link 1006 may be similar to the communication network 208, as described in conjunction with the preceding figures. In an example implementation, the computing environment 1000 may be for example, the computing environment 200. In an example, the processor(s) 1002 may have one or more processing resources for fetching and executing computer-readable instructions from the non-transitory computer-readable medium 1004. The processor(s) 1002 and the non-transitory computer-readable medium 1004 may be implemented, for example, in the system 100 (as has been described in conjunction with the preceding figures).

The non-transitory computer-readable medium 1004 may be, for example, an internal memory device or an external memory device. In an example implementation, the communication link 1006 may be a network communication link. The processor(s) 1002 and the non-transitory computer-readable medium 1004 may also be communicatively coupled to the OT environment over a network 1008. The network 1008 may be similar to the communication network 208 described in conjunction with FIG. 2.

In an example implementation, the non-transitory computer-readable medium 1004 may include a set of computer-readable instructions 1010 which may be accessed by the processor(s) 1002 through the communication link 1006. Referring to FIG. 10, in an example, the non-transitory computer-readable medium 1004 may include instructions 1010 that may cause the processor(s) 1002 to obtain operation data corresponding to an asset, say the asset 202, operating within the OT environment of an organization. The operation data may be indicative of one or more operating parameter values associated with the asset. The operation data may be further indicative of a timing information indicating a particular time at which the one or more operating parameter values are obtained. In an example, the asset may be a device, a system, or a machine associated with the organization. The one or more operating parameter values may be defined as values of operating parameters related to the different assets within the OT environment. For example, if one of the assets is a controller, the one or more operating parameter values may include values of operating parameters such as an average free time of the controller, an average uptime of the controller, a minimum free time of the controller, and an average operating cycle of the controller. In an example, the operation data may be obtained from the asset operating within the OT environment. In another example, the operation data may be obtained from a centralized server, say the server 202-3, managing operations of the assets operating within the OT environment of the organization.

In an example, the instructions 1010 may further cause the processor(s) 1002 to process the operation data to detect any anomaly in the one or more operating parameter values. In an example, an anomaly detection model may be utilized for processing the operation data. The anomaly detection model may be an artificial intelligence (AI) model trained on ideal operation data of the assets to detect anomalies within the OT environment. The ideal operation data may indicate ideal operating parameter values with which the assets operate during normal operation when any adversary is not accessing a communication network of the organization. In an example, an anomaly may be detected whenever any of the one or more operating parameter values deviate from the ideal operating parameter values corresponding to the asset.

In one example, the instructions 1010 may cause the processor(s) 1002 to obtain IT data corresponding to the organization upon detecting an anomaly in at least one of the one or more operating parameter values. The IT data may include network access and activity logs associated with the communication network of the organization. The network access and activity logs may be defined as access attempt details and activity details related to the assets in the OT environment and all other network devices, say the network device 204, connected to the communication network of the organization. The IT data may be obtained for a pre-defined time window around the particular time. In an example, the pre-defined time window may be decided by a user as a fixed time preceding and succeeding the particular time at which the anomaly has been detected. In an example, the pre-defined time window may be initially set as a default value and may be dynamically modified later according to the situation at hand. For example, the pre-defined time window may be initially set to thirty minutes and may be changed if no logs in the IT data can be correlated to the anomaly. Thus, if the anomaly is detected at a time X, then the IT data may be fetched for thirty minutes before the time X in case of real-time threat detection. In case the threat detection is not real-time, then the IT data may be fetched for thirty minutes before and after the time X.

In one example, the instructions 1010 may cause the processor(s) 1002 to process the operation data and the IT data to ascertain possibility of a cyberthreat event. The possibility of a cyberthreat event may be ascertained based on a correlation between the anomaly and an unusual activity detected in the network access and activity logs. For example, the unusual activity may be a system update performed, using a dormant or an unauthorized user account, just ten minutes before the time of occurrence of the anomaly. In an example, a threat analysis model may be utilized for obtaining the IT data and for processing the operation data with the IT data. The threat analysis model may be a generative AI model trained on historical cyberattack data corresponding to a plurality of historic cyberattacks. The historical cyberattack data may be obtained from global databases that may include data related to various cyberattacks that have occurred in the past. The historical cyberattack data may indicate historical perturbation patterns of assets and network devices during each of the plurality of historic cyberattacks. Further, the historical cyberattack data may indicate preventive actions that have ability to prevent the historic cyberattack. In an example, a possibility of a cyberthreat event may be ascertained whenever perturbation pattern defined by the correlation between the anomaly and the unusual activity is found to be similar to any of the historical perturbation patterns.

In an example, for processing the operation data and the IT data, the instructions 1010 may cause the processor(s) 1002 to analyze the operation data and the IT data to identify a perturbation pattern of the asset and the network devices connected to the communication network. Further, the instructions 1010 may cause the processor(s) 1002 to compare the perturbation pattern with historical perturbation patterns related to one or more historic cyberattacks to ascertain the possibility of the cyberthreat event. The possibility of the cyberthreat event may be ascertained when the perturbation pattern is found to be similar to any of the historical perturbation patterns or similar to a combination of any of the historical perturbation patterns.

The instructions 1010 may then cause the processor(s) 1002 to analyze the correlation to generate an alert upon ascertaining a possibility of a cyberthreat event. The alert may include recommendation for preventing a cyberattack on the communication network. In an example, the threat analysis model may be utilized for generating the alert. Thus, in an example, the recommendation may be provided based on the preventive actions indicated by the historical cyberattack data. The alert may enable a supervisor to proactively engage in adversary pursuit and threat hunting.

In an example, for analyzing the correlation, the instructions 1010 may cause the processor(s) 1002 to determine a degree of similarity between the perturbation pattern and a historical perturbation pattern corresponding to each of the one or more historic cyberattacks. Further, the instructions 1010 may cause the processor(s) 1002 to identify at least one historic cyberattack, from the one or more historic cyberattacks, that is associated with the historical perturbation pattern determined to have the degree of similarity above a threshold similarity level. In an example, the threshold similarity level may be pre-defined by a subject matter expert. In another example, the threshold similarity level may be defined by the threat analysis model based on training on the historical cyberattack data. The instructions 1010 may cause the processor(s) 1002 to obtain preventive actions having ability to prevent the at least one historic cyberattack. Further, the instructions 1010 may cause the processor(s) 1002 to determine the recommendation based on the preventive actions. By analyzing the degree of similarity, the most relevant historic cyberattacks may be efficiently identified for the scenario of the organization that is under consideration. Thus, a most relevant recommendation may be efficiently generated for preventing the cyberattack.

In an example, the instructions 1010 may cause the processor(s) 1002 to assign a severity index to the cyberthreat event based on the degree of similarity. Further, the instructions 1010 may cause the processor(s) 1002 to incorporate the severity index into the alert for transmission to a supervisor on a supervisor device. Thus, the alert enables the supervisor to prioritize most critical alerts and prevent the cyberattack before any data or device of the organization is maliciously affected.

In an example, the instructions 1010 may cause the processor(s) 1002 to obtain a visual representation of the anomaly. Further, the instructions 1010 may cause the processor(s) 1002 to incorporate the visual representation into the alert for transmission to the supervisor on the supervisor device. Thus, the alert enables the supervisor to visualize and quickly gauge the difference between ideal operation of the asset and anomalous operation of the asset, enabling the supervisor to initiate preventive actions in a timely manner.

In an example, the anomaly detection model may be trained for enabling detection of anomalies within the OT environment. The anomaly detection model may identify patterns in data provided for training to use such patterns for detection of the anomalies during operations of the assets within the OT environment of the organization.

In an example, for training the anomaly detection model, the instructions 1010 may cause the processor(s) 1002 to obtain ideal operation data corresponding to the asset. The ideal operation data may be indicative of different ideal operating parameter values associated with the asset. Further, the ideal operation data may be indicative of corresponding time at which the different ideal operating parameter values are obtained. The ideal operating parameter values may be defined as values of operating parameters related to the asset. For example, if the asset is a server, say the say server 202-3, the ideal operating parameter values may include values of operating parameters such as an average load of the server, a minimum load of the server, a maximum load of the server, and an average operating cycle of the server. The ideal operating parameter values may be obtained during normal operation of the asset when any adversary is not accessing the communication network of the organization. Different assets may be associated with different operating parameters. Thus, the anomaly detection model may be trained separately for each asset using separate ideal operation data.

Once the ideal operation data is obtained, the instructions 1010 may cause the processor(s) 1002 to analyze the ideal operation data to identify an ideal operating pattern of the asset. The ideal operating pattern of the asset may indicate how the asset operates at different times. The instructions 1010 may then cause the processor(s) 1002 to obtain the anomaly detection model based on training on the ideal operating pattern. The anomaly detection model may then be utilized for quickly and efficiently detecting anomalies within the OT environment by monitoring whether the asset deviates from the ideal operating pattern of the asset. The anomaly detection model may detect the anomalies even if there is a small deviation from the ideal operating pattern of the asset.

In an example, the threat analysis model may be trained for enabling detection of security threats within the OT environment. The threat analysis model may identify patterns in data provided for training to use such patterns for detection of the security threats and for the alert generation during operations of the assets 202 within the OT environment of the organization.

In an example, for training the threat analysis model, the instructions 1010 may cause the processor(s) 1002 to obtain historical cyberattack data corresponding to each of a plurality of historic cyberattacks. The historical cyberattack data for each historic cyberattack may include historical operation data of assets operating in OT environments of one or more organizations affected during the historic cyberattack. The historical operation data may be indicative of values of operating parameters associated with the assets operating in the OT environments during the historic cyberattack. Further, the historical cyberattack data for each historic cyberattack may include historical IT data of the assets and network devices operating within communication networks of the one or more organizations at the time of the historic cyberattack. The historical IT data may be indicative of network access and activity logs associated with the communication networks of the one or more organizations.

Once the historical cyberattack data is obtained, the instructions 1010 may cause the processor(s) 1002 to analyze the historical cyberattack data for each historic cyberattack. The historical cyberattack data may be analyzed to determine perturbation pattern data. The perturbation pattern data may indicate a perturbation pattern of the assets and the network devices during the historic cyberattack.

The instructions 1010 may then cause the processor(s) 1002 to obtain an initial version of the threat analysis model based on training on the perturbation pattern data corresponding to the plurality of historic cyberattacks. The initial version of the threat analysis model may be utilized for quickly and efficiently detecting security threats whenever any anomaly is detected in the OT environment. The initial version of the threat analysis model may detect the security threats by monitoring whether the assets and the network devices are operating in an unusual manner that is similar to patterns observed in any of the plurality of historic cyberattacks.

For enabling alert generation including recommendation for preventing cyberattacks, the instructions 1010 may cause the processor(s) 1002 to may obtain analysis data for each historic cyberattack. The analysis data may indicate preventive actions that have ability to prevent the historic cyberattack. In an example, the analysis data may be obtained from the global databases that may include data related to various cyberattacks that have occurred in past. In another example, the analysis data may be generated based on inputs from subject matter experts who may have analyzed the historic cyberattack to devise the preventive actions.

Once the analysis data is obtained, the instructions 1010 may cause the processor(s) 1002 to analyze the preventive actions to obtain a fine-tuned version of the threat analysis model. The fine-tuned version of the threat analysis model may be utilized for generating alerts having effective recommendations for quickly preventing any cyberattack on the communication network before any data or device of the organization is maliciously affected.

Thus, the described approaches not only efficiently and quickly detect a cyberthreat, but also provide recommendations for preventing the cyberattack by automatically identifying a root cause of the anomaly based on the correlation. The described approaches provide a simple and robust analytical methodology for early, quick, efficient, and automated detection of cyberthreat events in the OT environment.

Although examples for the present disclosure have been described in language specific to structural features and/or methods, it is to be understood that the appended claims are not necessarily limited to the specific features or methods described. Rather, the specific features and methods are disclosed and explained as examples of the present disclosure.

We claim:

1. A system comprising:

one or more processors; and a memory storing instructions that, when executed by the one or more processors, cause the one or more processors to:

obtain operation data corresponding to an asset operating within an operational technology (OT) environment of an organization, the operation data being indicative of one or more operating parameter values associated with the asset and a timing information indicating a particular time at which the one or more operating parameter values are obtained;

an anomaly detection engine implementing an anomaly detection model to:

process the operation data to detect any anomaly in the one or more operating parameter values;

upon detecting an anomaly, via a threat analysis model, in at least one of the one or more operating parameter values, obtain information technology (IT) data corresponding to the organization for a pre-defined time window around the particular time, wherein the pre-defined time window is dynamically modified based on whether the network access and activity logs can be correlated to the anomaly, the IT data including network access and activity logs associated with a communication network of the organization, wherein the threat analysis model comprising a generative artificial intelligence (AI) model trained on historical cyberattack data corresponding to a plurality of historic cyberattacks; and process the operation data and the IT data to ascertain possibility of a cyberthreat event based on a correlation between the anomaly and an unusual activity detected in the network access and activity logs, wherein a perturbation pattern is identified based on the correlation, and the possibility of the cyberthreat event is ascertained in an instance in which the perturbation pattern is determined to be similar to at least one historical perturbation pattern indicated by the historical cyberattack data; and upon ascertaining a possibility of a cyberthreat event, analyze the correlation to generate an alert including recommendation for preventing a cyberattack on the communication network.

2. The system of claim 1, wherein the one or more processors are further caused to:

obtain ideal operation data corresponding to the asset, wherein the ideal operation data is indicative of different ideal operating parameter values associated with the asset and corresponding time at which the different ideal operating parameter values are obtained;

analyze the ideal operation data to identify an ideal operating pattern of the asset; and obtain the anomaly detection model based on training on the ideal operating pattern of the asset.

3. The system of claim 1, wherein the one or more processors are further caused to:

obtain historical cyberattack data corresponding to each of a plurality of historic cyberattacks, wherein, for each historic cyberattack, the historical cyberattack data includes:

historical operation data of assets operating in OT environments of one or more organizations affected during the historic cyberattack, and historical IT data of the assets and network devices operating within communication networks of the one or more organizations at the time of the historic cyberattack;

for each historic cyberattack, analyze the historical cyberattack data to determine perturbation pattern data indicating a perturbation pattern of the assets and the network devices during the historic cyberattack; and obtain an initial version of the threat analysis model based on training on the perturbation pattern data corresponding to the plurality of historic cyberattacks.

4. The system of claim 3, wherein the one or more processors are further caused to:

for each historic cyberattack, obtain analysis data indicating preventive actions having ability to prevent the historic cyberattack; and analyze the preventive actions to obtain a fine-tuned version of the threat analysis model.

5. The system of claim 1, wherein to process the operation data and the IT data, the one or more processors are further caused to:

analyze the operation data and the IT data to identify a perturbation pattern of the asset and network devices connected to the communication network; and compare the perturbation pattern with historical perturbation patterns related to one or more historic cyberattacks to ascertain the possibility of the cyberthreat event.

6. The system of claim 5, wherein to analyze the correlation, the one or more processors are further caused to:

for each of the one or more historic cyberattacks, determine a degree of similarity between the perturbation pattern and a historical perturbation pattern corresponding to the historic cyberattack;

identify at least one historic cyberattack, from the one or more historic cyberattacks, associated with the historical perturbation pattern determined to have the degree of similarity above a threshold similarity level;

obtain preventive actions having ability to prevent the at least one historic cyberattack; and determine the recommendation based on the preventive actions.

7. The system of claim 5, wherein the one or more processors are further caused to:

determine a degree of similarity between the perturbation pattern and the historical perturbation patterns;

assign a severity index to the cyberthreat event based on the degree of similarity; and incorporate the severity index into the alert for transmission to a supervisor on a supervisor device.

8. The system of claim 1, wherein the one or more processors are further caused to:

obtain a visual representation of the anomaly; and incorporate the visual representation into the alert for transmission to a supervisor on a supervisor device, wherein the visual representation enables the supervisor to visualize a difference between ideal operation of the asset and anomalous operation of the asset so as to initiate preventive actions in a timely manner.

9. A method comprising:

obtaining operation data corresponding to an asset operating within an operational technology (OT) environment of an organization, the operation data being indicative of one or more operating parameter values associated with the asset and a timing information indicating a particular time at which the one or more operating parameter values are obtained;

processing, utilizing an anomaly detection model, the operation data to detect any anomaly in the one or more operating parameter values;

upon detecting an anomaly in at least one of the one or more operating parameter values, obtaining information technology (IT) data corresponding to the organization for a pre-defined time window around the particular time, wherein the pre-defined time window is dynamically modified based on whether the network access and activity logs can be correlated to the anomaly, the IT data including network access and activity logs associated with a communication network of the organization;

processing the operation data, the IT data, and historical cyberattack data to ascertain possibility of a cyberthreat event, the historical cyberattack data including pattern and analysis data related to each of one or more historic cyberattacks, wherein a perturbation pattern is identified based on a correlation between the anomaly and an unusual activity detected in the network access and activity logs, and the possibility of the cyberthreat event is ascertained in an instance in which the perturbation pattern is determined to be similar to at least one historical perturbation pattern extracted from the pattern and analysis data; and upon ascertaining a possibility of a cyberthreat event, analyzing, utilizing a threat analysis model, the threat analysis model comprising a generative artificial intelligence (AI) model trained on the historical cyberattack data, the pattern and analysis data to generate an alert including recommendation for preventing a cyberattack on the communication network.

10. The method of claim 9, wherein the method comprises:

obtaining ideal operation data corresponding to the asset, wherein the ideal operation data is indicative of different ideal operating parameter values associated with the asset and corresponding time at which the different ideal operating parameter values are obtained;

analyzing the ideal operation data to identify an ideal operating pattern of the asset; and obtaining the anomaly detection model based on training on the ideal operating pattern of the asset.

11. The method of claim 9, wherein the method comprises:

obtaining historical cyberattack data corresponding to each of a plurality of historic cyberattacks, wherein, for each historic cyberattack, the historical cyberattack data includes:

historical operation data of assets operating in OT environments of one or more organizations affected during the historic cyberattack, and historical IT data of the assets and network devices operating within communication networks of the one or more organizations during the historic cyberattack;

for each historic cyberattack, analyzing the historical cyberattack data to determine perturbation pattern data indicating a perturbation pattern of the assets and the network devices during the historic cyberattack; and obtaining an initial version of the threat analysis model based on training on the perturbation pattern data corresponding to the plurality of historic cyberattacks.

12. The method of claim 11, wherein the method comprises:

for each historic cyberattack, obtaining analysis data indicating preventive actions having ability to prevent the historic cyberattack; and analyzing the preventive actions to obtain a fine-tuned version of the threat analysis model.

13. The method of claim 9, wherein processing the operation data, the IT data, and the historical cyberattack data comprises:

analyzing the operation data and the IT data to identify a perturbation pattern of the asset and network devices connected to the communication network;

extracting historical perturbation patterns related to the one or more historic cyberattacks from the pattern and analysis data; and comparing the perturbation pattern with the historical perturbation patterns to ascertain the possibility of the cyberthreat event.

14. The method of claim 13, wherein analyzing the pattern and analysis data comprises:

for each of the one or more historic cyberattacks, determining a degree of similarity between the perturbation pattern and a historical perturbation pattern corresponding to the historic cyberattack;

identifying at least one historic cyberattack, from the one or more historic cyberattacks, associated with the historical perturbation pattern determined to have the degree of similarity above a threshold similarity level;

obtaining preventive actions having ability to prevent the at least one historic cyberattack; and determining the recommendation based on the preventive actions.

15. A non-transitory computer-readable medium comprising instructions for detecting a security threat in an operational technology (OT) environment, the instructions being executable by a processing resource to:

obtain operation data corresponding to an asset operating within an OT environment of an organization, the operation data being indicative of one or more operating parameter values associated with the asset and a timing information indicating a particular time at which the one or more operating parameter values are obtained;

process, utilizing an anomaly detection model, the operation data to detect any anomaly in the one or more operating parameter values;

upon detecting an anomaly in at least one of the one or more operating parameter values, obtain information technology (IT) data corresponding to the organization for a pre-defined time window around the particular time, wherein the pre-defined time window is dynamically modified based on whether the network access and activity logs can be correlated to the anomaly, the IT data including network access and activity logs associated with a communication network of the organization;

process, utilizing a threat analysis model, the threat analysis model comprising a generative artificial intelligence (AI) model trained on historical cyberattack data corresponding to a plurality of historic cyberattacks, the operation data and the IT data to ascertain possibility of a cyberthreat event based on a correlation between the anomaly and an unusual activity detected in the network access and activity logs, wherein a perturbation pattern is identified based on the correlation, and the possibility of the cyberthreat event is ascertained in an instance in which the perturbation pattern is determined to be similar to at least one historical perturbation pattern indicated by the historical cyberattack data; and upon ascertaining a possibility of a cyberthreat event, analyze, utilizing the threat analysis model, the correlation to generate an alert including recommendation for preventing a cyberattack on the communication network.

16. The non-transitory computer-readable medium of claim 15, wherein the instructions are executable by the processing resource to:

obtain ideal operation data corresponding to the asset, wherein the ideal operation data is indicative of different ideal operating parameter values associated with the asset and corresponding time at which the different ideal operating parameter values are obtained;

analyze the ideal operation data to identify an ideal operating pattern of the asset; and obtain the anomaly detection model based on training on the ideal operating pattern of the asset.

17. The non-transitory computer-readable medium of claim 15, wherein the instructions are executable by the processing resource to:

obtain historical cyberattack data corresponding to each of a plurality of historic cyberattacks, wherein, for each historic cyberattack, the historical cyberattack data includes:

historical operation data of assets operating in OT environments of one or more organizations affected during the historic cyberattack, and historical IT data of the assets and network devices operating within communication networks of the one or more organizations at the time of the historic cyberattack;

for each historic cyberattack, analyze the historical cyberattack data to determine perturbation pattern data indicating a perturbation pattern of the assets and the network devices during the historic cyberattack; and obtain an initial version of the threat analysis model based on training on the perturbation pattern data corresponding to the plurality of historic cyberattacks.

18. The non-transitory computer-readable medium of claim 17, wherein the instructions are executable by the processing resource to:

for each historic cyberattack, obtain analysis data indicating preventive actions having ability to prevent the historic cyberattack; and analyze the preventive actions to obtain a fine-tuned version of the threat analysis model.

19. The non-transitory computer-readable medium of claim 15, wherein to process the operation data and the IT data, the instructions are executable by the processing resource to:

analyze the operation data and the IT data to identify a perturbation pattern of the asset and network devices connected to the communication network; and compare the perturbation pattern with historical perturbation patterns related to one or more historic cyberattacks to ascertain the possibility of the cyberthreat event.

20. The non-transitory computer-readable medium of claim 19, wherein to analyze the correlation, the instructions are executable by the processing resource to:

for each of the one or more historic cyberattacks, determine a degree of similarity between the perturbation pattern and a historical perturbation pattern corresponding to the historic cyberattack;

identify at least one historic cyberattack, from the one or more historic cyberattacks, associated with the historical perturbation pattern determined to have the degree of similarity above a threshold similarity level;

obtain preventive actions having ability to prevent the at least one historic cyberattack; and determine the recommendation based on the preventive actions.

* * * * *